United States Patent
Choi et al.

(10) Patent No.: US 9,680,628 B2
(45) Date of Patent: *Jun. 13, 2017

(54) METHOD AND APPARATUS FOR TRANSMITTING CONTROL CHANNEL IN INTRA-CELL CARRIER AGGREGATION SYSTEM

(71) Applicant: Samsung Electronics Co., Ltd., Suwon-si, Gyeonggi-do (KR)

(72) Inventors: Seunghoon Choi, Suwon-si (KR); Joonyoung Cho, Suwon-si (KR); Youngbum Kim, Seoul (KR); Hyoungju Ji, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,948

(22) Filed: Feb. 29, 2016

(65) Prior Publication Data

US 2016/0182211 A1 Jun. 23, 2016

Related U.S. Application Data

(63) Continuation of application No. 13/950,737, filed on Jul. 25, 2013, now Pat. No. 9,276,691.

(30) Foreign Application Priority Data

Jul. 25, 2012 (KR) .................. 10-2012-0081428
Feb. 7, 2013 (KR) .................. 10-2013-0014018

(51) Int. Cl.
*H04J 3/00* (2006.01)
*H04L 5/14* (2006.01)
(Continued)

(52) U.S. Cl.
CPC .............. *H04L 5/14* (2013.01); *H04J 3/1694* (2013.01); *H04L 1/1854* (2013.01);
(Continued)

(58) Field of Classification Search
CPC ...................... H04W 72/1278; H04L 5/0055
See application file for complete search history.

(56) References Cited

U.S. PATENT DOCUMENTS 9,025,515 B2     5/2015  Kim et al.
9,113,468 B2 *   8/2015  Kishiyama ............ H04L 1/0026
(Continued)

FOREIGN PATENT DOCUMENTS

CA       2807077 A1     2/2012
CN    101925113 A      12/2010
(Continued)

OTHER PUBLICATIONS

Intel Corporation, Timing and Pathloss Reference for SCell to Support MTA and Inter-band CA, R2-116271, 3GPP TSG-RAN WG2 #76, Nov. 14-18, 2011, San Francisco, CA.
(Continued)

*Primary Examiner* — Maharishi Khirodhar
(74) *Attorney, Agent, or Firm* — Jefferson IP Law, LLP

(57) ABSTRACT

A method for receiving control channel and an apparatus in a wireless communication system are provided. The method includes transmitting, at a base station, information on a primary cell operating in a frequency division duplexing (FDD) mode and a secondary cell operating in a time division duplexing (TDD) mode, transmitting, at the base station, downlink scheduling information for downlink data, transmitting, at the base station, the downlink data in a first subframe according to the downlink scheduling information, and receiving, at the base station, control information corresponding to the downlink data on the primary cell, from a
(Continued)

terminal. The control information is transmitted using a physical uplink control channel (PUCCH) format determined based on a type of the first subframe of the secondary cell.

16 Claims, 25 Drawing Sheets

(51) Int. Cl.
     *H04J 3/16*      (2006.01)
     *H04W 72/12*      (2009.01)
     *H04L 1/18*      (2006.01)
     *H04L 7/06*      (2006.01)
     *H04L 5/00*      (2006.01)

(52) U.S. Cl.
     CPC .......... *H04L 1/1887* (2013.01); *H04L 5/0053* (2013.01); *H04L 5/0055* (2013.01); *H04L 5/1469* (2013.01); *H04L 7/06* (2013.01); *H04W 72/1278* (2013.01); *H04L 5/001* (2013.01); *H04L 5/143* (2013.01)

(56) References Cited

U.S. PATENT DOCUMENTS

| | | |
|---|---|---|
| 2007/0121531 A1 | 5/2007 | Lee et al. |
| 2011/0267993 A1 | 11/2011 | Seo et al. |
| 2012/0076063 A1 | 3/2012 | Jiang et al. |
| 2012/0106404 A1 | 5/2012 | Damnjanovic |
| 2012/0155337 A1 | 6/2012 | Park |
| 2013/0034028 A1 | 2/2013 | Chen et al. |
| 2013/0070689 A1* | 3/2013 | Liu ................... H04W 72/0413 370/329 |
| 2013/0121301 A1 | 5/2013 | Kim et al. |
| 2013/0170406 A1 | 7/2013 | Kishiyama |
| 2013/0315114 A1 | 11/2013 | Seo et al. |
| 2013/0343239 A1* | 12/2013 | Damnjanovic ......... H04L 5/001 370/280 |

FOREIGN PATENT DOCUMENTS

| | | |
|---|---|---|
| CN | 102394685 A | 3/2012 |
| EP | 2613600 A1 | 7/2013 |
| KR | 10-2012-0017445 A | 2/2012 |
| WO | 2010-079951 A1 | 7/2010 |
| WO | 2012-029873 A1 | 3/2012 |
| WO | 2012-061257 A1 | 5/2012 |

OTHER PUBLICATIONS

3GPP TS 36.213 v10.6.0 3rd Generation Partnership Project; Technical Specification Group Radio Access Network; Evolved Universal Terrestrial Radio Access (E-UTRA); Physical layer procedures (Release 10), Jun. 2012.

* cited by examiner

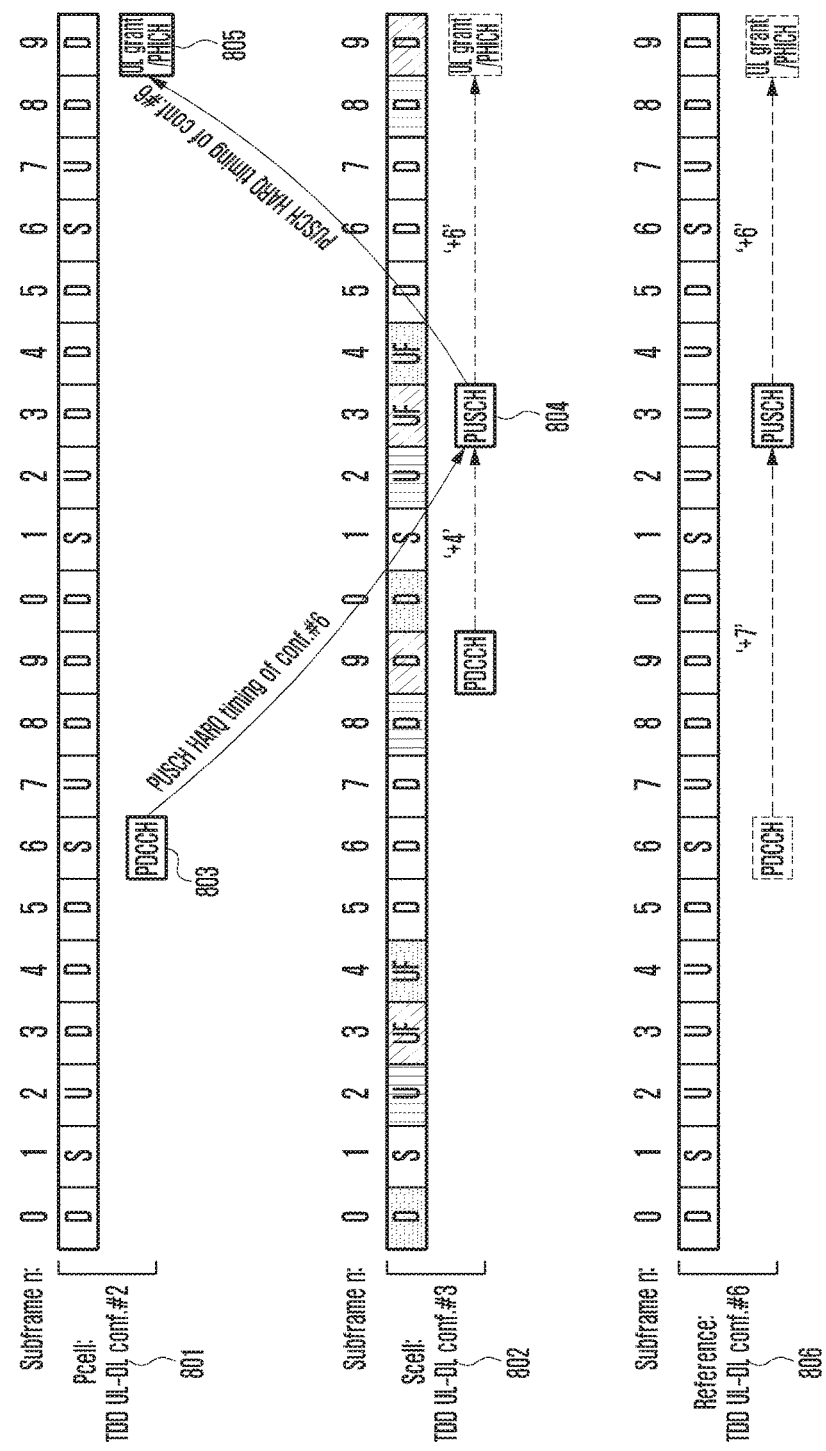

METHOD AND APPARATUS FOR TRANSMITTING CONTROL CHANNEL IN INTRA-CELL CARRIER AGGREGATION SYSTEM

CROSS-REFERENCE TO RELATED APPLICATION(S)

This is a continuation application of a prior U.S. patent application assigned Ser. No. 13/950,737 filed Jul. 25, 2013, which issues as U.S. Pat. No. 9,276,691 on Mar. 1, 2016, and which claims the benefit under 35 U.S.C. §119(a) of a Korean patent application filed on Jul. 25, 2012 in the Korean Intellectual Property Office and assigned Ser. No. 10-2012-0081428 and a Korean patent application filed on Feb. 7, 2013 in the Korean Intellectual Property Office and assigned Ser. No. 10-2013-0014018, the entire disclosure of each of which is hereby incorporated by reference.

TECHNICAL FIELD

The present disclosure relates to a method and an apparatus for transmitting control channels in an intra-cell carrier aggregation system. More particularly, the present disclosure relates to a method and an apparatus for transmitting control channels in an intra-frequency carrier aggregation system including plural cells operating in different duplexing modes.

BACKGROUND

Mobile communication systems are developed to provide subscribers with voice communication services on the move. With rapid technological advancement, the mobile communication systems have evolved to support high speed data communication services as well as the standard voice communication services. However, the limited resource and user requirements for higher speed services in the current mobile communication system spur the evolution to more advanced mobile communication systems.

The $3^{rd}$ Generation Partnership Project (3GPP) Long Term Evolution-Advanced (LTE-A) is a technology for implementing a high speed packet-based communication at the data rate of up to 1 Gbps. In LTE-A, a User Equipment (UE) is served by an evolved Node B (eNB) in multiple cells but sends feedback to the respective cells through a Primary cell (PCell). In LTE-A, all the cells configured for a UE operate in Frequency Division Duplex (FDD) or Time Division Duplex (TDD). The TDD can be classified into one of a static TDD in which the Uplink-Downlink (UL-DL) configuration is fixed and a dynamic TDD in which the UL-DL configuration varies according to system information, a higher layer, or a downlink common control channel.

In the state that a cell under the control of an eNB operates in the FDD mode, if a frequency band is added, it is likely to apply TDD to this new frequency band. This is because FDD uses two separate frequency bands for DL and UL.

Accordingly, when multiple cells operating in different duplexing modes coexist due to the addition of limited frequency band as aforementioned or due to other reasons, there is a need of a method for transmitting the control channels corresponding to the data transmitted in the different cells efficiently. In a case where the feedback for multiple cells should be transmitted through the PCell in association with the uplink control channel corresponding to the downlink data, there is also a need of a technique for the UE to transmit the feedback to the cells operating with different frame structures through the PCell. Furthermore, there is a need of a technique for the eNB to schedule the uplink data of the UE in association with the downlink control channel corresponding to uplink data and transmit the downlink control channel corresponding to the uplink data.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for transmitting control channels in an intra-frequency carrier aggregation system including plural cells operating in different duplexing modes.

Another aspect of the present disclosure is to provide a method for transmitting an uplink control channel corresponding to a Time Division Duplex (TDD) cell's downlink data using a Frequency Division Duplex (FDD) cell's uplink control channel transmission timing.

Another aspect of the present disclosure is to provide a method for scheduling a TDD cell's uplink data and for transmitting a downlink control channel corresponding to the uplink data using an FDD cell's uplink data scheduling timing and downlink control channel transmission timing.

Another aspect of the present disclosure is to provide a method for transmitting an uplink control channel corresponding to a TDD cell's downlink data using a reference Uplink-Downlink (UL-DL) configuration timing.

Another aspect of the present disclosure is to provide a method for scheduling a dynamic TDD cell's uplink data and transmitting a downlink control channel corresponding to the uplink data using a reference UL-DL configuration's uplink data scheduling timing and downlink control channel transmission timing.

Another aspect of the present disclosure is to provide a method for using a TDD configuration's control channel transmission timing at an FDD cell's uplink subframe matching the TDD cell's uplink subframe when downlink and uplink subframes are configured according to the TDD configuration, and the FDD configuration's control channel transmission timing at the FDD cell's uplink subframe mismatching the TDD cell's uplink subframe.

Another aspect of the present disclosure is to provide a method for scheduling an FDD cell's uplink data transmission in a TDD cell and for transmitting a downlink control channel corresponding to uplink data using a control channel transmission timing defined in the FDD cell.

In accordance with an aspect of the present disclosure, a method for receiving control channel in a wireless communication system is provided. The method includes transmitting, at a base station, information on a primary cell operating in a FDD mode and a secondary cell operating in a TDD mode, transmitting, at the base station, downlink scheduling information for downlink data, transmitting, at the base station, the downlink data in a first subframe according to the downlink scheduling information, and receiving, at the base station, control information corresponding to the downlink data on the primary cell, from a terminal. The control information is transmitted using a physical uplink control channel (PUCCH) format determined based on a type of the first subframe of the secondary cell.

In accordance with another aspect of the present disclosure, an apparatus in a wireless communication system is provided. The apparatus includes a transceiver and a control unit. The transceiver is configured to transmit and receive at least one signal. The control unit is configured to transmit information on a primary cell operating in an FDD mode and a secondary cell operating in a TDD mode, transmit downlink scheduling information for downlink data, transmit the downlink data in a first subframe according to the downlink scheduling information, and receive control information corresponding to the downlink data on the primary cell from a terminal. The control information is transmitted using a PUCCH format determined based on a type of the first subframe of the secondary cell.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will become more apparent from the following description taken in conjunction with the accompanying drawings, in which:

FIG. 8 is a diagram illustrating a principle of a control channel transmission method based on a transmission timing of a reference UL-DL configuration according to a sixth embodiment of the present disclosure;

The same reference numerals are used to represent the same elements throughout the drawings.

DETAILED DESCRIPTION

Figure 1A:
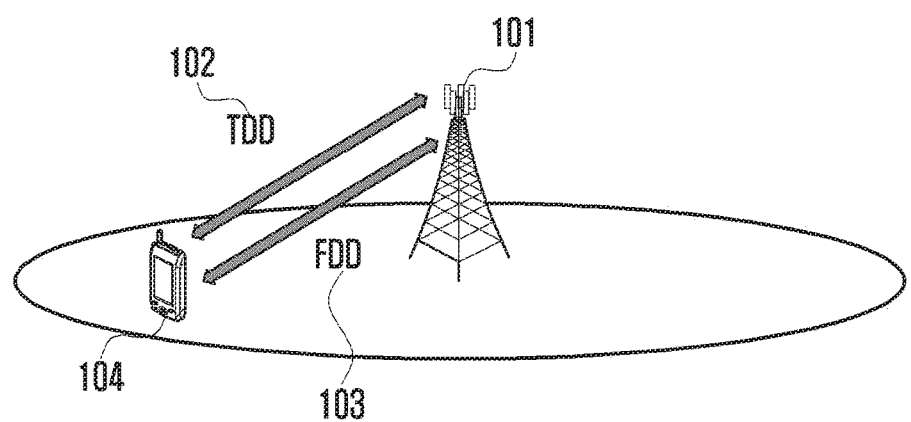
FIGS. 1A and 1B are diagrams illustrating communication systems according to embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Although the description is directed to Long Term Evolution (LTE) and LTE-Advanced (LTE-A) systems herein, the present disclosure can be applied to other communication systems with a slight modification, without departing from the spirit and scope of the present disclosure.

An Orthogonal Frequency Division Multiplexing (OFDM) is a transmission technique for transmitting data using multiple carriers, i.e., a multicarrier data transmission technique which parallelizes the serial input stream into parallel data streams and modulates the data streams onto the orthogonal multiple carriers, i.e., sub-carrier channels.

In the OFDM system, the modulation signal is mapped to 2-dimensional resource, i.e., time-frequency resource. The time resource is divided into OFDM symbols. The frequency resource is divided into tones orthogonal among each other. In OFDM system, the minimum resource unit is Resource Element (RE) which is defined by an OFDM symbol on the time axis and a tone on the frequency axis. Although they experiences different frequency selective channel fading, the signals mapped to the orthogonal REs can be received at the receiver without interference among each other.

The physical channel is a physical layer channel for transmitting modulation symbol output by modulating one or more coded bit streams. In an Orthogonal Frequency Division Multiple Access (OFDMA) system, multiple physical channel can be configured according to the purpose of the information bit stream or the receiver. The rule of pairing the physical channel with RE is referred to as mapping.

In the OFDM system, the downlink bandwidth is divided into a plurality of Resource Blocks (RBs) and each Physical Resource Block (PRB) consists of 12 subcarriers in frequency axis and 14 or 12 OFDM symbols in time domain. Here, the PRB is a basic unit for resource allocation.

A Reference Signal (RS) is the signal transmitted by the eNB for use in UE's channel estimation, and the LTE communication system uses a Common Reference Signal (CRS) and a DeModulation Reference Signal (DMRS) as the dedicated reference signal.

A CRS is transmitted across the entire downlink bandwidth such that all UEs can receive CRS for use in channel estimation, feedback information configuration, and control and data channel demodulation. DMRS is also transmitted across the entire downlink bandwidth for use in UE-specific data channel demodulation and channel estimation but not in feedback information configuration unlike CRS. Accordingly, DMRS is transmitted on the PRB resource for scheduling UE.

On the time axis, a subframe consists of two slots of 0.5 msec, i.e., first and second slots. A Physical Dedicated Control Channel (PDCCH) carried in the control channel and enhanced PDCCH (ePDCCH) carried in the data region are transmitted in a time-divisional manner. This is to receive and demodulate the control channel with priority. The PDCCH region is also arranged across the entire downlink bandwidth in the structure where a control channel is divided into small unit control channels distributed across the entire downlink bandwidth.

The uplink physicals are classified into a Physical Uplink Control Channel (PUCCH) and a Physical Uplink Shared Channel (PUSCH), and the acknowledgement channel corresponding to downlink data channel and other feedback information are transmitted, if data channel exists, on the control channel and, otherwise, on the data channel.

Figure 1B:
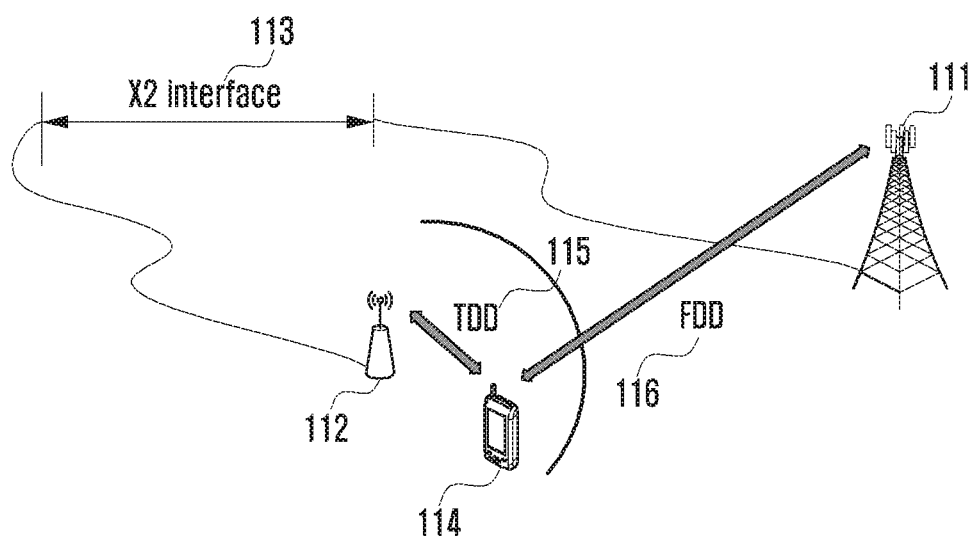

FIGS. 1A and 1B are diagrams illustrating communication systems according to embodiments of the present disclosure.

Referring to FIG. 1A, a situation is illustrated where a Time Division Duplex (TDD) cell 102 and a Frequency Division Duplex (FDD) cell 103 coexist under an evolved Node B (eNB) 101 and thus a User Equipment (UE) 104 communicates data with the eNB 101 through the TDD and FDD cells 102 and 103, respectively. However, when the FDD cell 103 is the primary cell, the uplink transmission occurs through the FDD cell 103.

Referring to FIG. 1B, a situation is illustrated where a macro eNB 111 having a large coverage and a pico eNB 112 for increase of data throughput coexist. The UE 114 communicates data with the macro eNB 111 and the pico eNB 112 operating in an FDD 116 and a TDD 115, respectively. However, when the macro eNB 111 is a Primary cell (PCell), the uplink transmission occurs through the macro eNB 111. At this time, it is assumed that the macro and pico eNBs 111 and 112, respectively, have an ideal backhaul network. Accordingly, this means that the eNBs are connected to each other through X2 interface 113 and thus, the pico eNB 112 is capable of receiving control information from the macro eNB 111 in real-time although the uplink transmission occurs to the macro eNB 111.

Although the method proposed in the present disclosure is applicable to both the systems of FIGS. 1A and 1B, the description is mainly directed to the system of FIG. 1A.

Figure 2A:
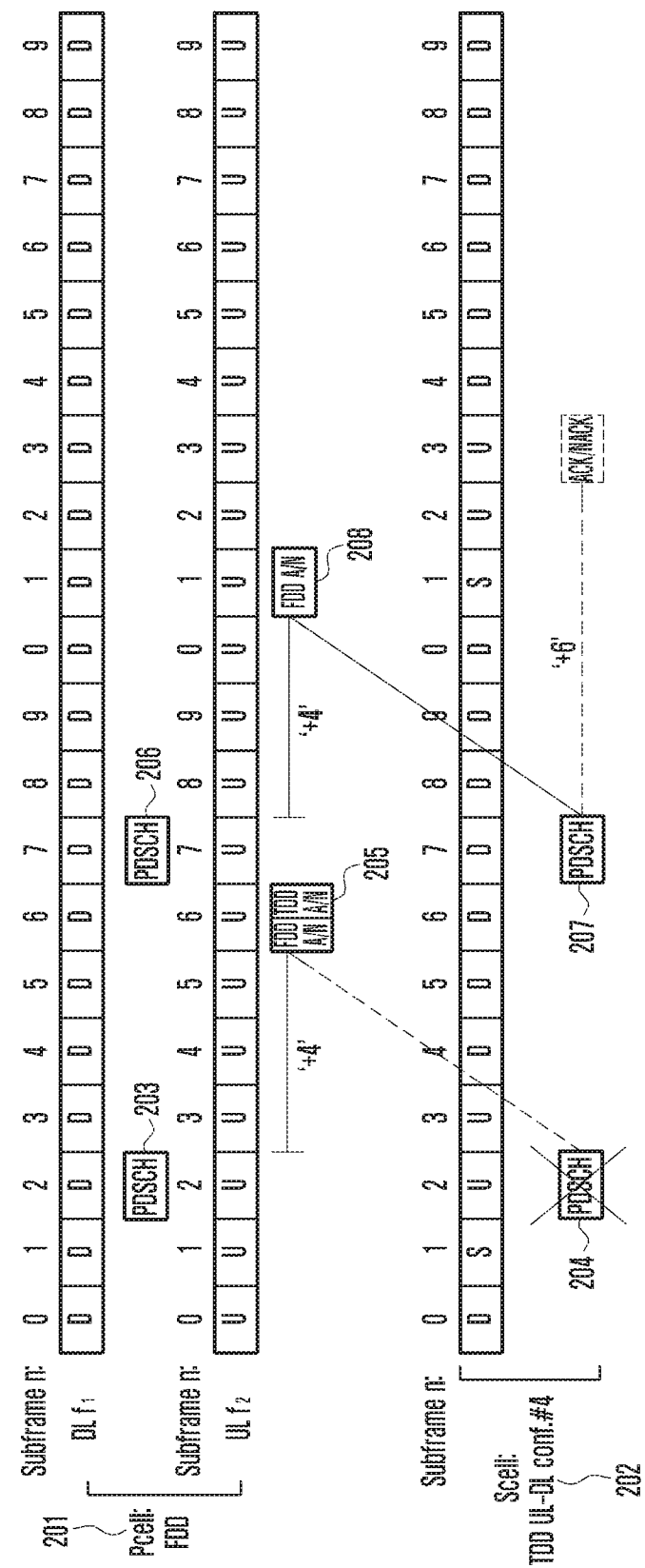
FIG. 2A is a diagram illustrating a principle of a control channel transmission method based on a Frequency Division Duplex (FDD) cell's timing according to a first embodiment of the present disclosure.
Figure 2B:
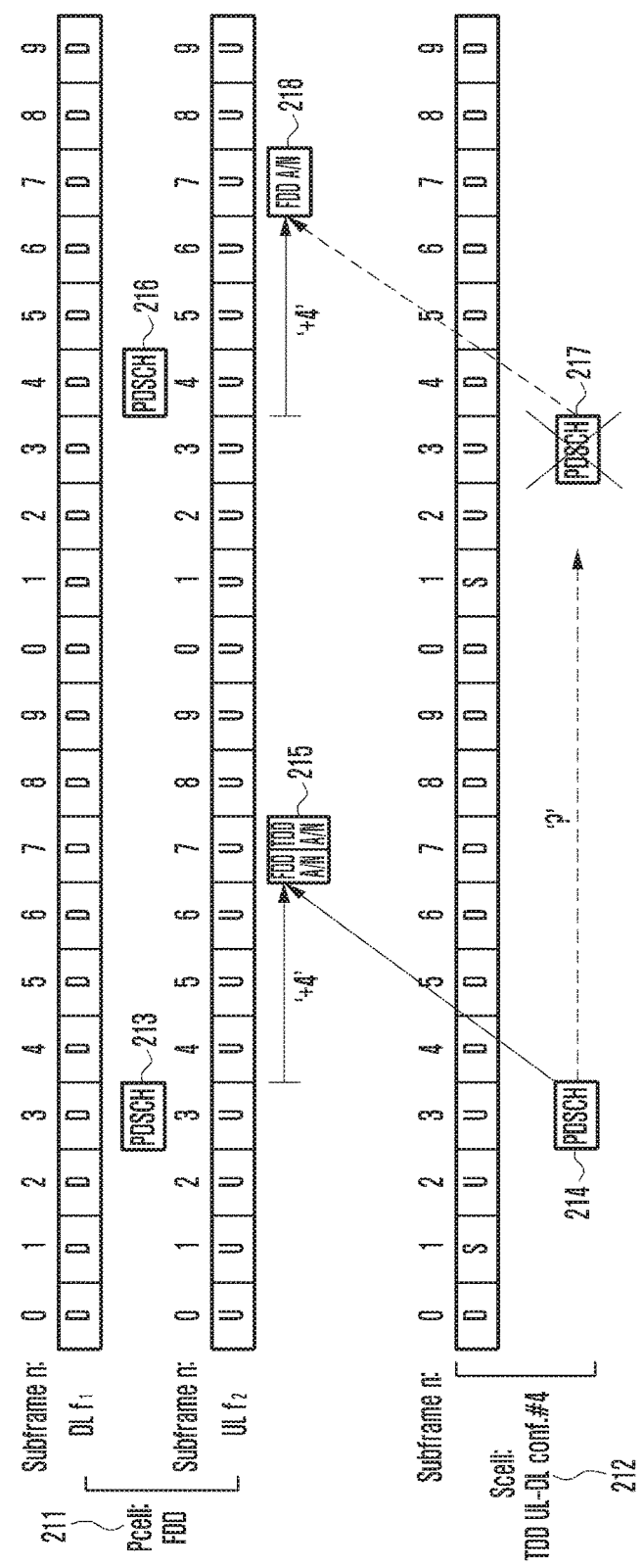
FIG. 2B is a diagram illustrating a principle of a control channel transmission method based on an FDD cell's timing according to a second embodiment of the present disclosure.

FIG. 2A is a diagram illustrating a principle of a control channel transmission method based on an FDD cell's timing according to a first embodiment of the present disclosure, and FIG. 2B is a diagram illustrating a principle of a control channel transmission method based on an FDD cell's timing according to a second embodiment of the present disclosure.

In the first and second embodiments of FIGS. 2A and 2B, when the uplink control channel corresponding to downlink data is transmitted in the TDD cell, the User Link (UL) control channel transmission timing of the FDD cell is applied. In the first embodiment of FIG. 2A, it is assumed that two cells operating in different duplexing modes coexist.

Referring to FIG. 2A, a PCell operates in an FDD mode 201 with downlink transmission frequency of f1 and uplink transmission frequency f2. A Secondary cell (SCell) operates in a static TDD mode 202 with Down Link (DL) and Up Link (UL) subframes according to the TDD UL-DL configuration #4. If a Physical Downlink Shared Channel (PDSCH) 207 is scheduled at the subframe #7 of the static TDD cell 202, a Hybrid Automatic Repeat reQuest-ACKnowledgement (HARQ-ACK) corresponding to the PDSCH 207 is transmitted in the UL subframe #1 on frequency f2 of the FDD cell 201 after 4 subframes since the transmission of PDSCH according to the UL control channel transmission timing of the FDD cell. In the method of the related art, the HARQ-ACK corresponding to the PDSCH 207 is configured to be transmitted in the UL subframe #3 after 6 subframes since the transmission of PDSCH 207 in the TDD UL-DL configuration #4. At this time, if PDSCH 206 is scheduled at subframe #7, the HARQ-ACK corresponding to PDSCH 206 is transmitted, after 4 subframes since the PDSCH transmission, at UL subframe #1 of frequency f2 of the FDD cell 201 as multiplexed with the HARQ-ACK corresponding to PDSCH 207 as denoted by reference number 208.

If PDSCH 203 is scheduled at subframe #2 in the FDD cell 201, the HARQ-ACK corresponding to PDSCH 203 is transmitted at UL subframe #6 on frequency f2 of the FDD cell 201. At this time, PDSCH 204 of the static TDD cell 202 cannot be scheduled because subframe #2 of the static TDD cell is a UL subframe. Accordingly, the uplink subframe #6 on frequency f2 of the FDD cell 201 carries the HARQ-ACK corresponding to PDSCH 203 of the FDD cell 201 as denoted by reference number 205.

At this time, a difference occurs as compared to the situation where FDD or TDD cells exist. Assuming a situation where two FDD (or TDD) cells exist, it is possible to transmit the uplink control channel in the same format at every uplink subframe. If format 1b with channel selection is configured in LTE Rel-10 system, the uplink control channel is transmitted in format 1b with channel selection at every UL subframe regardless of PDSCH scheduling. In the above situation where PDSCH 204 cannot be scheduled because subframe #2 is the UL subframe in the static TDD cell 202, since the eNB and the UE may be negotiated to use simple transmission format, such as format 1a or 1b, it is possible to reduce the UL control channel reception complexity at the subframe and use the UL control channel transmission resources configured for the format 1b with channel selection for another purposes, such as UL data transmission.

In contrast to the case of FIG. 2A, if the PCell operates in a static TDD mode with TDD UL-DL configuration #4 having UL and DL subframes and if the SCell operates in an FDD mode, the HARQ-ACK corresponding to PDSCH carried in a DL subframe of the SCell can be transmitted at UL subframe of the PCell according to the HARQ-ACK transmission timing defined in the TDD UL-DL configuration #4 of the PCell. Since the subframe of the PCell is a UL subframe, the HARQ-ACK corresponding to PDSCH transmitted at the DL subframe not having HARQ-ACK transmission timing can be transmitted at the PCell's UL subframe arriving first after 4 subframes since the PDSCH transmission. Alternatively, since the subframe of the PCell is the UL subframe, the PDSCH carried in the SCell's UL subframe having no HARQ-ACK transmission timing may be ruled out or restricted in the scheduling.

FIG. 2B illustrates a control channel transmission timing in a situation where cells operating in different duplexing modes coexist according to the second embodiment of the present disclosure.

Referring to FIG. 2B, a PCell operates in an FDD mode 211 with the downlink frequency f1 and the uplink frequency f2. An SCell operates in a dynamic TDD mode 212 with DL and UL subframes according to the TDD UL-DL configuration #4. In the dynamic TDD cell 212, subframes #2 and #3 are flexible (or dynamic) subframes that can be configured as uplink subframes according to the TDD UL-DL configuration #4 or, oppositely, downlink subframes. The configuration information indicating whether to configure the flexible subframe as a downlink subframe or an uplink subframe is transmitted to the UE through a higher layer signal, system information, and a downlink common control channel.

According to the dynamic subframe configuration information indicating that the dynamic subframe #3 is used as a DL subframe, PDSCH 214 can be scheduled at the dynamic subframe #3 in the dynamic TDD cell 212. The HARQ-ACK corresponding to PDSCH 214 is transmitted at uplink subframe #7 on frequency f2 of the FDD cell 211 after 4 subframes since the PDSCH transmission according to the UL control channel transmission timing of the FDD cell proposed in the present disclosure as denoted by reference number 215. Since the subframe #3 in the original TDD UL-DL configuration #4 is the uplink subframe, no HARQ-ACK transmission time corresponding to the PDSCH is defined. At this time, if the PDSCH 213 is scheduled at the subframe #3 in the FDD cell 211, the HARQ-ACK corresponding to PDSCH 213 is transmitted at the UL subframe #7 on the frequency f2 of the FDD cell 211 as multiplexed with the HARQ-ACK corresponding to PDSCH 214 as denoted by reference number 215.

Suppose that the dynamic subframe configuration information indicating that the dynamic subframe #3 is used as the uplink subframe is sent to the UE. If PDSCH 216 is scheduled at subframe #3 of the FDD cell 211, the HARQ-ACK corresponding to the PDSCH 216 is transmitted at the uplink subframe #7 on the frequency f2 of the FDD cell 211 after 4 subframes since the PDSCH transmission. At this time, since the dynamic subframe #3 of the FDD cell 212 is used as the uplink subframe, the PDSCH 217 of the dynamic TDD cell 212 cannot be scheduled. Accordingly, the uplink subframe #7 on the frequency f2 of the FDD cell 211 carries the HARQ-ACK FDD A/N corresponding to the PDSCH 216 of the FDD cell 211 as denoted by reference number 218.

At this time, a difference occurs as compared to the situation where FDD or TDD cells exist. Assuming a situation where two FDD (or TDD) cells exist, it is possible to transmit the uplink control channel in the same format at every uplink subframe. If format 1b with channel selection is configured in LTE Rel-10 system, the uplink control channel is transmitted in format 1b with channel selection at every UL subframe regardless of PDSCH scheduling. In the above situation where PDSCH 217 cannot be scheduled because dynamic subframe #3 is used as the UL subframe in the dynamic TDD cell 202, since the eNB and the UE may be negotiated to use simple transmission format, such as format 1a or 1b, it is possible to reduce the UL control channel reception complexity at the subframe and use the UL control channel transmission resources configured for the format 1b with channel selection for another purposes, such as UL data transmission.

In contrast to the case of FIG. 2B, if the PCell operates in a dynamic TDD mode with TDD UL-DL configuration #4 having UL and DL subframes and if the SCell operates in the FDD mode, the HARQ-ACK corresponding to PDSCH carried at the downlink subframe of the SCell can be transmitted at the uplink subframe of the PCell or the dynamic subframe used as an uplink subframe according to the HARQ-ACK transmission timing defined in the reference UL-DL configuration of the PCell.

The reference UL-DL configuration may be the TDD UL-DL configuration #4 as the UL-DL configuration of PCell or the TDD UL-DL configuration including all downlink subframes when the cell operate with the downlink subframes of the TDD UL-DL configuration #4 and the dynamic subframes are used as downlink subframes.

Since the subframe of the PCell is an uplink subframe, the HARQ-ACK corresponding to PDSCH carried at the downlink subframe of the SCell having no HARQ-ACK transmission timing may be transmitted in the uplink subframe of the PCell arriving first after 4 subframes since the PDSCH transmission or at the dynamic subframe being used as an uplink subframe. In addition, since the subframe of the PCell is the UL subframe, the PDSCH carried in the SCell's UL subframe having no HARQ-ACK transmission timing may be ruled out or restricted in the scheduling.

As described above, by transmitting the uplink control channel corresponding to the data of the dynamic TDD cell 212 at the uplink control channel transmission timing of the FDD cell 211, the following effect is expected.

Typically, when the HARQ-ACK corresponding to a PDSCH is transmitted in the TDD cell, the spatial and time bundling techniques are used to transmit the HARQ-ACK corresponding to the PDSCH transmitted at multiple downlink subframes in order to overcome the shortage of uplink subframes. Although it is possible to transmit the HARQ-ACKs corresponding to PDSCHs transmitted at multiple DL subframes as compressed through the above bundling technique, the eNB cannot distinguish among the HARQ-ACKs corresponding to PDSCHs transmitted at multiple subframes, resulting in reduction of data rate.

Accordingly, when transmitting the uplink control channel corresponding to the data of the dynamic TDD cell 212, the UL control channel transmission timing of the FDD cell 211 is used such that the HARQ-ACK corresponding to the PDSCH transmitted at the downlink subframe of the dynamic TDD cell 212 can be transmitted at the uplink subframe of the FDD cell after 4 subframes since the PDSCH transmission. As a consequence, the bundling technique is negated such that the eNB is capable of identifying the HARQ-ACK corresponding to the PDSCH transmitted at every DL subframe of the dynamic TDD cell 212, resulting in an increase of data rate.

Figure 3A:
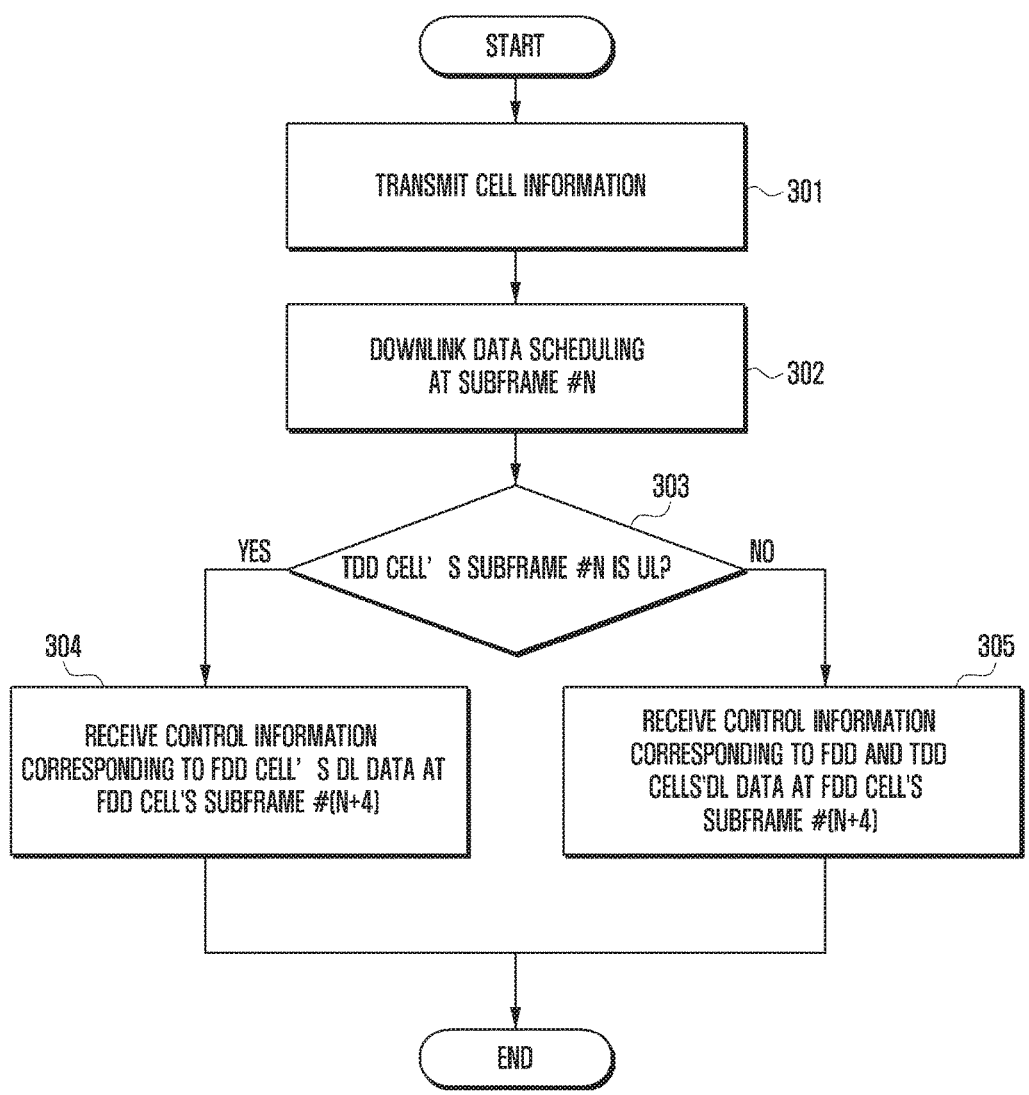
FIG. 3A is a flowchart illustrating an evolved Node B (eNB) procedure of a control channel transmission method according to an embodiment of the present disclosure.
Figure 3B:
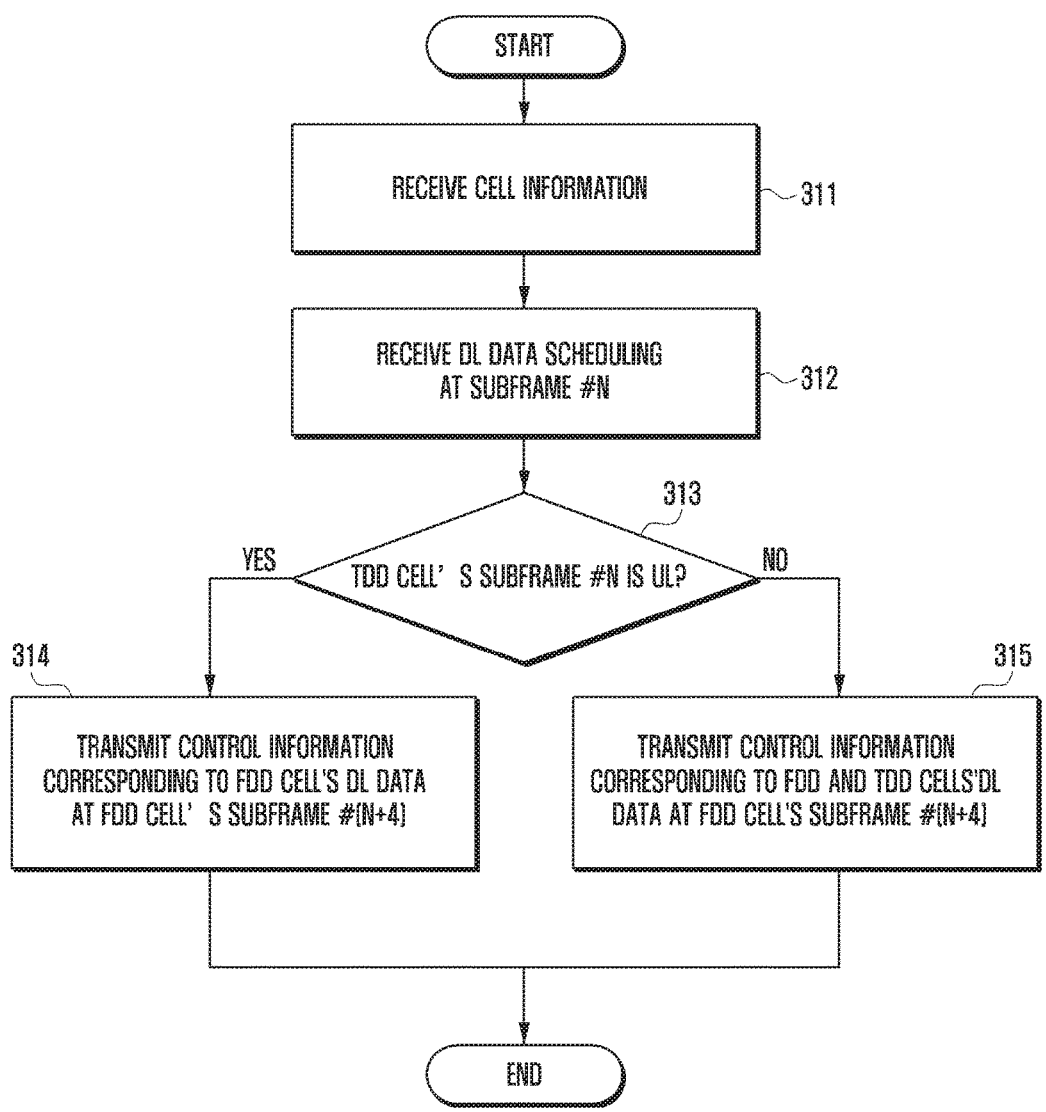
FIG. 3B is a flowchart illustrating a UE procedure of a control channel transmission method according to an embodiment of the present disclosure.

FIG. 3A is a flowchart illustrating an eNB procedure of a control channel transmission method according to an embodiment of the present disclosure, and FIG. 3B is a flowchart illustrating a UE procedure of a control channel transmission method according to an embodiment of the present disclosure.

Descriptions are made of the operation procedures of the eNB and the UE for transmitting the UL control channel corresponding to the DL data of the TDD cell at the UL control channel transmission timing of the FDD cell with reference to FIGS. 3A and 3B.

Referring to FIG. 3A, the eNB sends information on FDD and TDD cells to the UE at operation 301. The FDD and TDD cells' information may include at least one of the UL and DL frequencies of the FDD cell, TDD UL-DL configuration, or UL-DL configuration information and flexible frame configuration of the dynamic TDD cell. The FDD and TDD cell information may be transmitted to the UE through system information or higher layer signaling.

The eNB makes a scheduling decision on the DL data of FDD and TDD cells for the UE at subframe #n at operation 302. Thereafter, the eNB determines whether the subframe of the TDD cell at subframe #n is an uplink subframe at operation 303. If the TDD cell's subframe is the uplink subframe, the eNB receives the control information corresponding to the FDD cell's DL data at FDD cell's subframe #(n+4). At this time, if it is determined that the downlink data is not scheduled at the subframe #n in the FDD cell, the eNB may skip receiving the control information corresponding to the DL data of the FDD cell at FDD cell's subframe #(n+4) at operation 304. If the TDD cell's subframe is not the UL subframe, the eNB receives the control information corresponding to the FDD cell's DL data and the control information corresponding to the TDD cell's DL data at the FDD cell's subframe #(n+4) at operation 305.

Referring to FIG. 3B, the UE receives the information on the FDD and TDD cells at operation 311. The FDD and TDD cells' information may include at least one of the UL and DL frequencies of the FDD cell, TDD UL-DL configuration, or UL-DL configuration information and flexible frame configuration of the dynamic TDD cell. The FDD and TDD cell information may be received from the eNB through system information or higher layer signaling.

The UE receives the scheduling information on the DL data of the FDD and TDD cells at subframe #n at operation 312. Thereafter, the UE determines whether the TDD cell's subframe #n is the UL subframe at operation 313. If the TDD cell's subframe is the uplink subframe at operation 313, the UE transmits the control information corresponding to the FDD cell's DL data at the FDD cell's subframe #(n+4) at operation 314. At this time, if the UE does not receive the DL data scheduling information at FDD cell's subframe #n, the UE skips transmitting the control information corresponding to the DL data of the FDD cell at FDD cell's subframe #(n+4). If the TDD cell's subframe is not the UL subframe at operation 313, the UE sends the control information corresponding to the FDD cell's DL data and the TDD cell's DL data at the FDD cell's subframe #(n+4) simultaneously at operation 315.

Figure 4A:
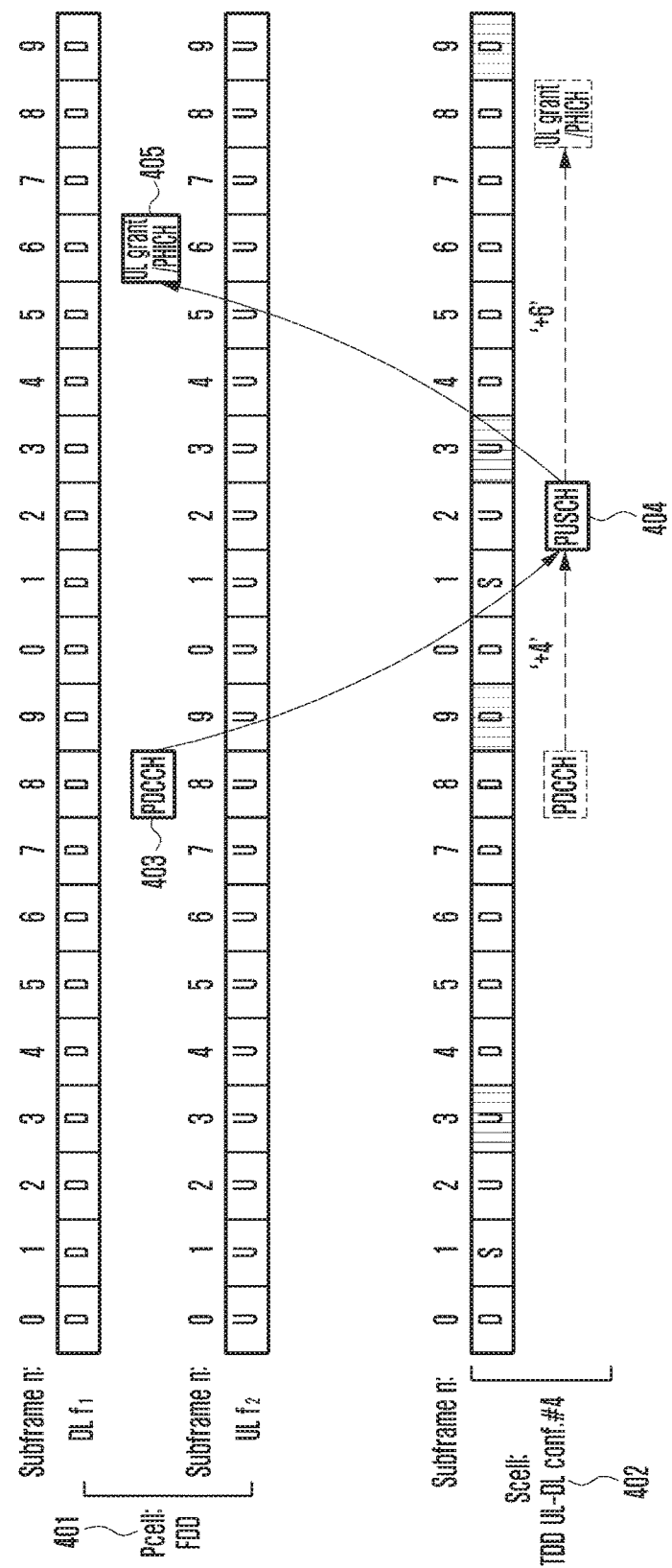
FIG. 4A is a diagram illustrating a principle of a control channel transmission method based on an FDD cell's timing according to a third embodiment of the present disclosure.
Figure 4B:
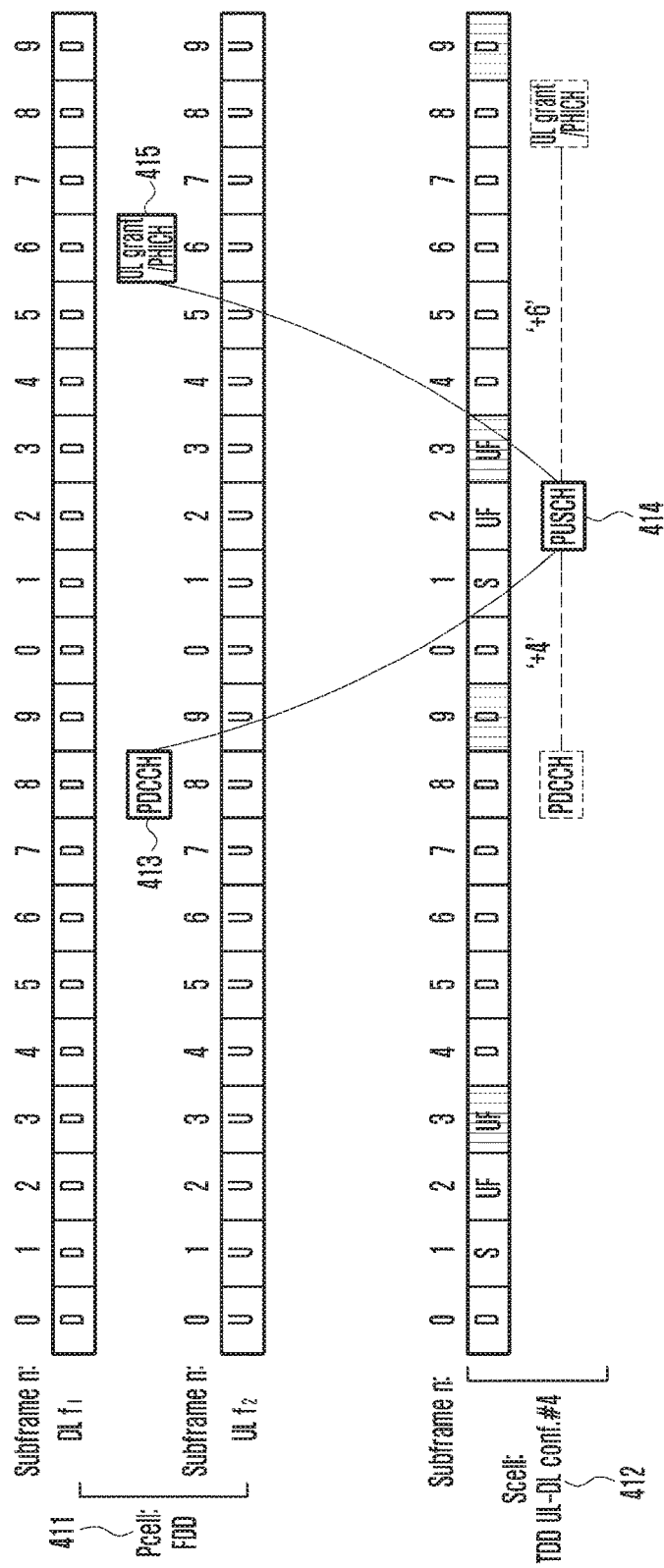
FIG. 4B is a diagram illustrating a principle of a control channel transmission method based on an FDD cell's timing according to a fourth embodiment of the present disclosure.

FIG. 4A is a diagram illustrating a principle of a control channel transmission method based on an FDD cell's timing according to a third embodiment of the present disclosure, and FIG. 4B is a diagram illustrating a principle of a control channel transmission method based on an FDD cell's timing according to a fourth embodiment of the present disclosure.

FIG. 4A illustrates a situation where the control channel is transmitted based on the FDD cell's timing according to the third embodiment of the present disclosure. A description is made of the procedure of scheduling TDD cell's uplink data and transmitting the downlink control channel corresponding to the uplink data by applying the FDD cell's uplink data scheduling timing and downlink control channel transmission timing.

FIG. 4A illustrates the uplink data scheduling and downlink control channel transmission according to the third embodiment of the present disclosure in the situation where the cells operating in different duplexing modes coexist.

Referring to FIG. 4A, a PCell operates in an FDD mode 401 with the DL frequency f1 and the UL frequency f2. An SCell operates in a static TDD mode 402 with the DL and UL subframes as defined in the TDD UL-DL configuration #4. If a PDCCH 403 carrying the scheduling information on the static TDD cell's UL data is transmitted at the FDD cell's DL subframe #8, the UE transmits PUSCH 404 at the static TDD cell's UL subframe #2 after 4 subframes since the PDCCH transmission according to the UL data transmission timing corresponding to the FDD cell's DL control channel transmission according to an embodiment of the present disclosure.

Thereafter, the DL control channel corresponding to PUSCH 404 scheduled at the UL subframe #2 of the static TDD cell 402 is transmitted by the eNB in the form of UL grant/Physical HARQ Indicator Channel (PHICH) 405 at the DL subframe #6 of the FDD cell 401 after 4 subframes since the PUSCH transmission according to the DL control channel transmission timing corresponding to the UL data transmission of the FDD cell. In the method of the related art, the UL data scheduled with the PDCCH at the DL subframe #8 is configured to be transmitted at the UL subframe #2 after 4 subframes since the PDCCH transmission, and the DL control channel corresponding to the PUSCH 404 transmitted at the UL subframe #2 is configured to be transmitted at the DL subframe #8 after 6 subframes since the PUSCH transmission.

As described above, the control channel transmission method is capable of scheduling UL data of the static TDD cell 402 and transmitting DL control channel corresponding to the UL data based on the FDD cell's UL data scheduling timing and DL control channel transmission timing so as to use earlier control channel transmission timing as compared to that defined for the legacy static TDD cell 402, resulting in an increase of data transmission throughput.

In contrast to the case of FIG. 4A, if the PCell operates in a static TDD mode with the TDD UL-DL configuration #4 and if the SCell operates in an FDD mode, the PUSCH scheduling at SCell's UL subframe occurs at the scheduling timing defined in the PCell's TDD UL-DL configuration #4. For example, the PDCCH for scheduling PUSCH of the SCell can be transmitted at the PCell's subframes #8 and #9. The SCell's PUSCH scheduled with PDCCH is transmitted at subframes #2 and #3. In addition, the DL control channel may be transmitted at the PCell's DL subframe according to the timing defined in the PCell's TDD UL-DL configuration #4. For example, the UL grant or PHICH corresponding to the SCell's PUSCH may be transmitted at the PCell's subframes #8 and #9.

FIG. 4B shows the uplink data scheduling and downlink control channel transmission according to the fourth embodiment of the present disclosure in the situation where the cells operating in different duplexing modes coexist.

Referring to FIG. 4B, a PCell operates in an FDD mode 411 with the DL frequency f1 and the UL frequency f2. An SCell operates in a dynamic TDD mode 412 with the TDD UL-DL configuration #4.

In the dynamic TDD cell 412 operating in the dynamic TDD mode, the subframes #2 and #3 are flexible subframes that can be used as uplink subframes or downlink subframes depending on the setting of the TDD UL-DL configuration #4. The configuration information indicating whether to UE the flexible subframe as UL subframe or DL subframe may be transmitted to the UE through a higher layer signaling, system information, or a downlink common control channel.

If the flexible subframe configuration information indicates that the flexible subframe #2 is used as an uplink subframe, a PUSCH 414 can be scheduled at the flexible subframe #2 of the dynamic TDD cell 412. If a PDCCH 413 for scheduling UL data of the dynamic TDD cell 412 is transmitted at the DL subframe #8 of the FDD cell 411, the UL data scheduled by the PDCCH 413 is transmitted in the form of the PUSCH 414 by the UE at the flexible subframe #2 of the dynamic TDD cell 412 after 4 subframes since the PDCCH transmission according to the UL data transmission timing corresponding to the FDD cell's DL control channel transmission as proposed in the present disclosure.

Thereafter, the DL control channel corresponding to the PUSCH 414 scheduled at the flexible subframe #2 of the dynamic TDD cell 412 is transmitted by the eNB in the form of UL grant/PHICH 415 at the DL subframe #6 of the FDD cell 411 after 4 subframes since the PUSCH transmission according to the UL control channel transmission timing corresponding to the FDD cell's UL data transmission as proposed in the present disclosure.

In the method of the related art, the TDD UL-DL configuration #4 is configured such that the UL data corresponding to PDCCH carried at the DL subframe #8 is transmitted at the UL subframe #2 after 4 subframes since the PDCCH transmission and the DL control channel corresponding to PUSCH carried at the UL subframe #2 is transmitted at the DL subframe #8 after 6 subframes since the PUSCH transmission.

As described above, the control channel transmission method is capable of scheduling UL data of the dynamic TDD cell 412 and transmitting DL control channel corresponding to the UL data based on the FDD cell's UL data scheduling timing and DL control channel transmission timing so as to use earlier control channel transmission timing as compared to that defined for the legacy dynamic TDD cell 412, resulting in an increase of data transmission throughput.

In contrast to the case of FIG. 4B, if the PCell operates in the dynamic TDD mode with the TDD UL-DL configuration #4 and if the SCell operates in the FDD mode, the SCell's PUSCH may be scheduled at the scheduling timing defined in the reference UL-DL configuration of the PCell. The reference UL-DL configuration may be the TDD UL-DL configuration #4 as the PCell's UL-DL configuration or the TDD UL-DL configuration including UL configurations of the TDD UL-DL configuration #4 and flexible subframes used as uplink subframes.

If the TDD UL-DL configuration #4 is used as the reference UL-DL configuration, the PDCCH for scheduling the SCell's PUSCH may be transmitted at the PCell's subframe #8 and #9. The SCell's PUSCH scheduled with the PDCCH is transmitted at the flexible subframes #2 and #3 used as UL subframes. The DL control channel may be transmitted at the PCell's DL subframe at the timing defined in the PCell's reference UL-DL configuration. If the TDD UL-DL configuration #4 is used as the reference UL-DL configuration, the UL grant or PHICH corresponding to the SCell's PUSCH may be transmitted at the PCell's subframes #8 and #9.

Figure 5A:
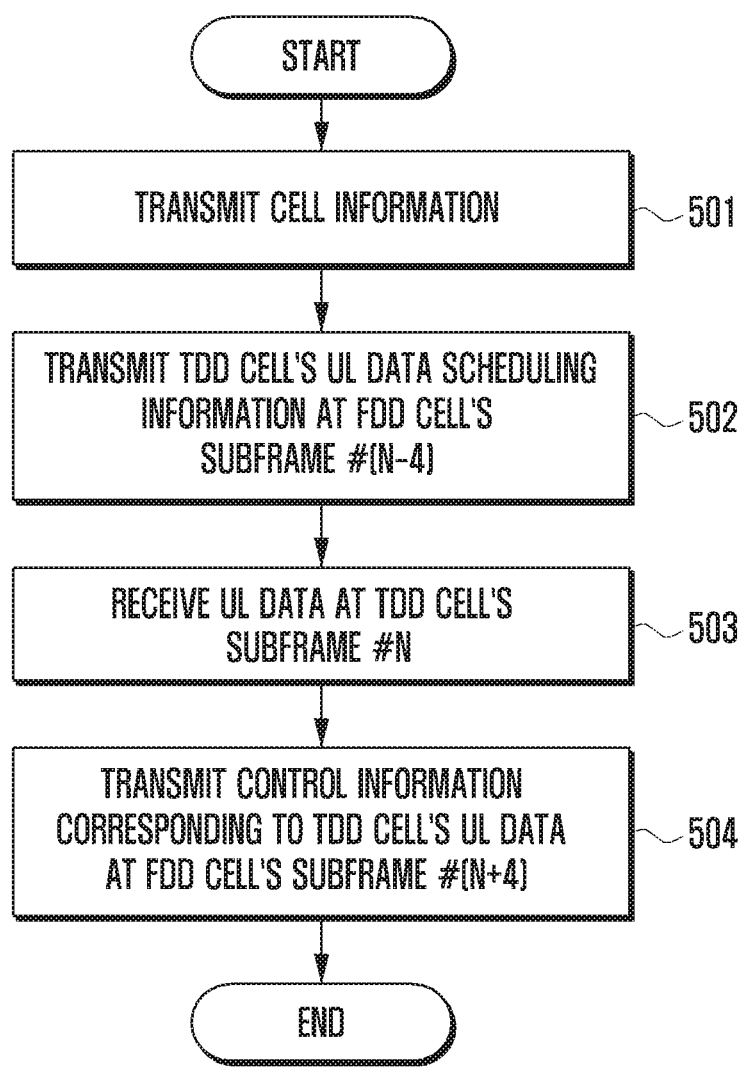
FIG. 5A is a flowchart illustrating an eNB procedure of a control channel transmission method according to an embodiment of the present disclosure.
Figure 5B:
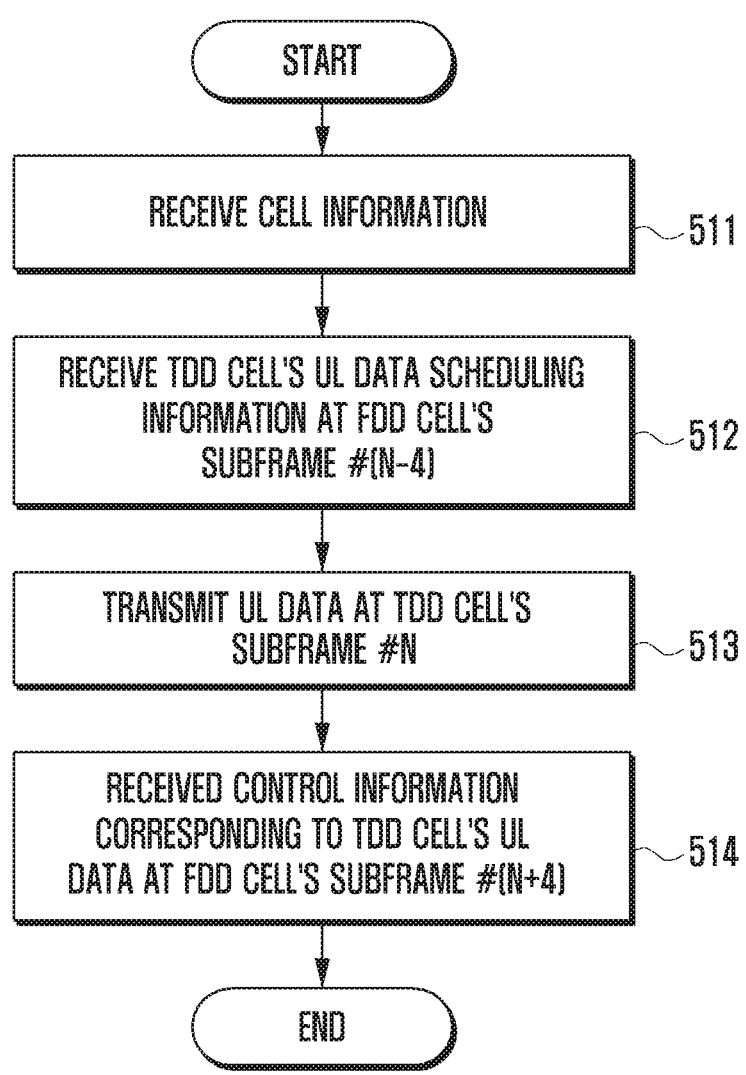
FIG. 5B is a flowchart illustrating a User Equipment (UE) procedure of a control channel transmission method according to an embodiment of the present disclosure.

FIG. 5A is a flowchart illustrating an eNB procedure of a control channel transmission method according to an embodiment of the present disclosure, and FIG. 5B is a flowchart illustrating a UE procedure of a control channel transmission method according to an embodiment of the present disclosure.

Descriptions are made of the operation procedures of the eNB and the UE for scheduling the TDD cell's UL data at the FDD cell's UL data scheduling timing and transmitting UL control channel corresponding to UL data of the TDD cell at the FDD cell's DL control channel transmission timing.

Referring to FIG. 5A, the eNB sends information on FDD and TDD cells to the UE at operation 501. The FDD and TDD cells' information may include at least one of the UL and DL frequencies of the FDD cell, TDD UL-DL configuration, or UL-DL configuration information and flexible frame configuration of the dynamic TDD cell. The FDD and TDD cell information may be transmitted to the UE through system information or a higher layer signaling.

The eNB makes a scheduling decision on the TDD UL data of the UE at the FDD cell's subframe #(n−4) and sends the scheduling information to the UE at operation 502. Thereafter, the eNB receives uplink data at TDD cell's subframe #n at operation 503. The eNB sends the control information corresponding to the TDD cell's UL data at the FDD cell's subframe #(n+4) at operation 504.

Referring to FIG. 5B, the UE receives the FDD and TDD cell information from the eNB at operation 511. The FDD and TDD cells' information may include at least one of the UL and DL frequencies of the FDD cell, TDD UL-DL configuration, and UL-DL configuration information and flexible frame configuration of the dynamic TDD cell. The UE receives the FDD and TDD cell information through system information or a higher layer signaling. The UE receives the TDD cell's UL data scheduling information at the FDD cell's subframe #(n−4) at operation 512. The UE sends the UL data at the TDD cell's subframe #n based on the scheduling information at operation 513. Thereafter, the UE receives the control information corresponding to the TDD cell's UL data at the FDD cell's subframe #(n+4) at operation 514.

Figure 6:
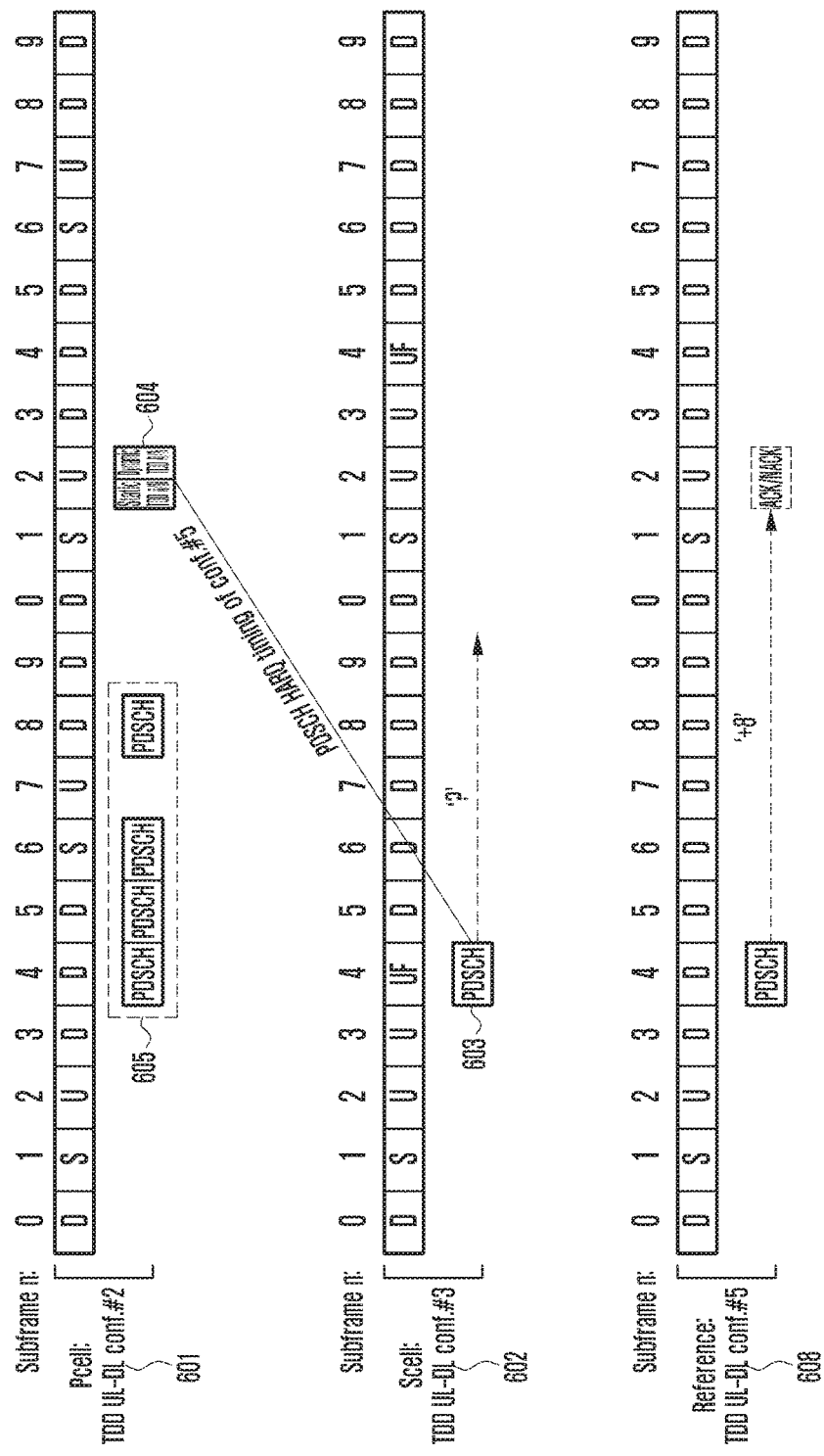
FIG. 6 is a diagram illustrating a principle of a control channel transmission method based on a transmission timing of a reference Uplink-Downlink (UL-DL) configuration according to a fifth embodiment of the present disclosure.

FIG. 6 is a diagram illustrating a principle of a control channel transmission method based on a transmission timing of a reference UL-DL configuration according to a fifth embodiment of the present disclosure.

The fifth embodiment of FIG. 6 is directed to the method for transmitting UL control channel corresponding to the TDD cell's DL data based on the transmission timing of the reference UL-DL configuration. FIG. 6 shows the UL control channel transmission in the situation where the cells operating in different duplexing modes coexist according to the fifth embodiment of the present disclosure.

Referring to FIG. 6, a PCell operates in a static TDD mode 601 with the TDD UL-DL configuration #2. An SCell operates in a dynamic TDD mode 602 with the TDD UL-DL configuration #3. The subframe #4 of the dynamic TDD cell 602 operating in the dynamic TDD mode is a flexible subframe which can be used as the UL subframe as configured in the TDD UL-DL configuration #3 or, if need be, a DL subframe. The configuration information indicating whether the flexible subframe is used as a UL subframe or a DL subframe can be transmitted to the UE through a higher layer signaling, system information, or a DL common control channel.

If it is notified to the UE that the flexile subframe #4 is used as the DL subframe, a PDSCH 603 may be scheduled at the flexible subframe #4 of the dynamic TDD cell 602. The HARQ-ACK corresponding to PDSCH 603 is transmitted at the UL subframe #2 of the static TDD cell 601 after 8 subframes since the PDSCH transmission according to the reference UL-DL configuration #5 608 as proposed in the present disclosure. At this time, the HARQ-ACK corresponding to PDSCH 603 is transmitted at the UL subframe of the static TDD cell 601 as multiplexed with HARQ-ACKs corresponding to PDSCHs 605 carried at plural DL subframes of the static TDD cell 601 as denoted by reference number 604.

Here, the reference UL-DL configuration is determined as follows. Assuming that the DL subframe of the TDD UL-DL configuration #2 of the static TDD cell 601, the DL subframe of the TDD UL-DL configuration #3 of the dynamic TDD cell 602, and the flexible subframe #4 of the dynamic TDD cell 602 as a DL subframe, the UL-DL configuration having all these matching downlink subframes is determined as the reference UL-DL configuration. The reference UL-DL configuration #5 of FIG. 6 includes all the DL subframes matching the DL subframe of the UL-DL configuration #2, DL subframe of the UL-DL configuration #3, and flexible subframes of the UL-DL configuration #3 as DL subframe.

Figure 7A:
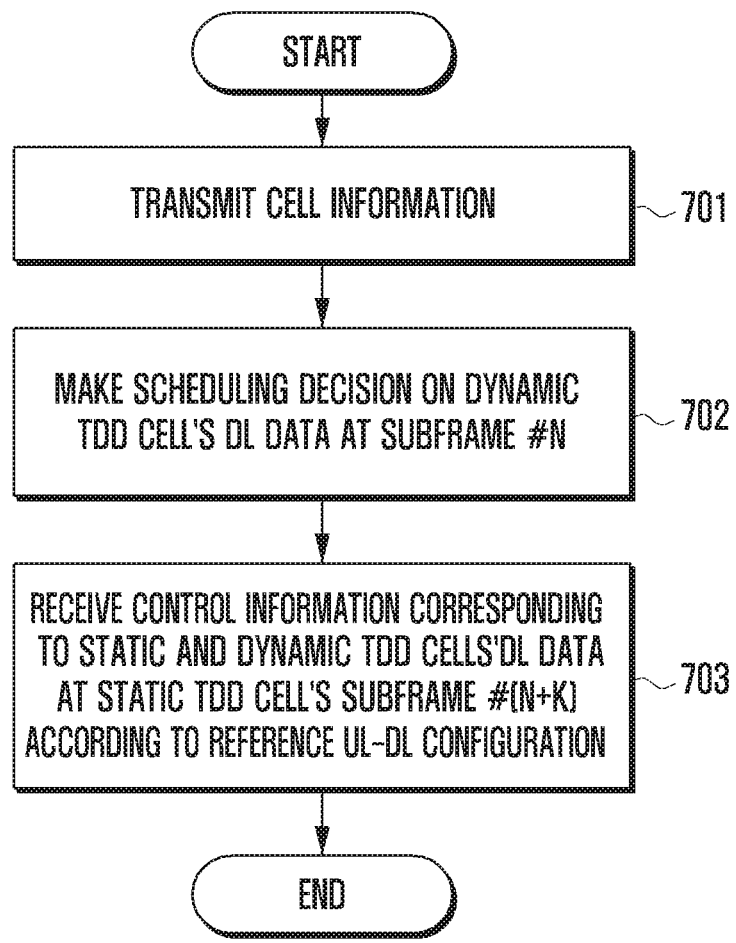
FIG. 7A is a flowchart illustrating an eNB procedure of a control channel transmission method according to an embodiment of the present disclosure.
Figure 7B:
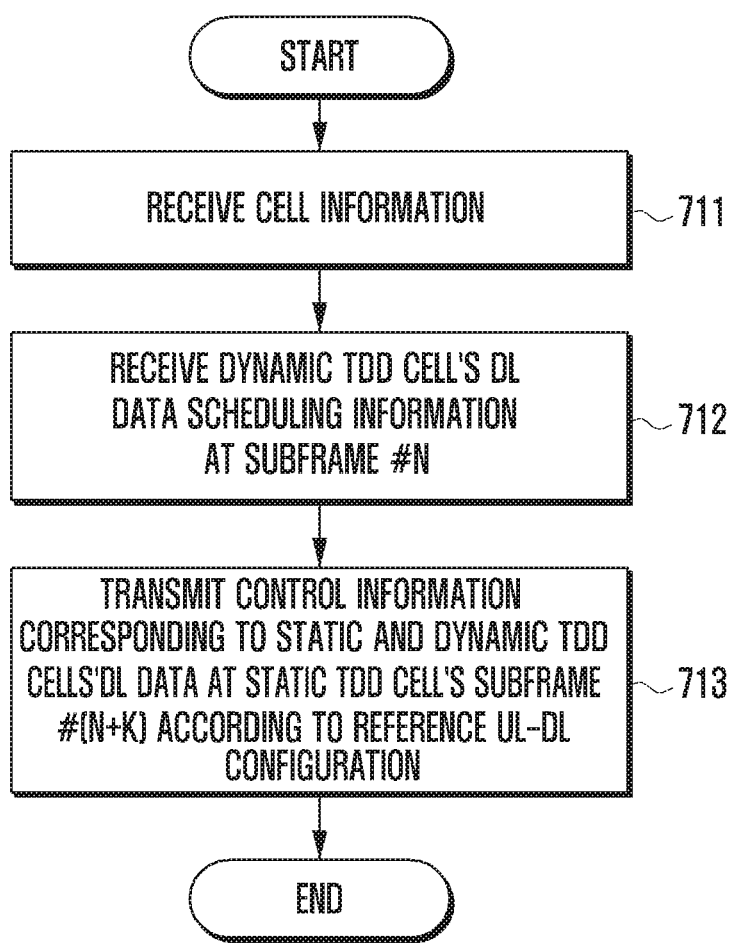
FIG. 7B is a flowchart illustrating a UE procedure of a control channel transmission method according to an embodiment of the present disclosure.

FIG. 7A is a flowchart illustrating an eNB procedure of a control channel transmission method according to an embodiment of the present disclosure, and FIG. 7B is a flowchart illustrating a UE procedure of a control channel transmission method according to an embodiment of the present disclosure.

Descriptions are made of the operations procedures of the eNB and UE for transmitting the UL control channel corresponding to the DL data of the dynamic TDD at the UL control channel transmission timing of the reference UL-DL configuration with reference to FIGS. 5A and 5B.

Referring to FIG. 7A, the eNB sends information on a static TDD cell and a dynamic TDD cell to the UE at operation 701. The information on the static and dynamic TDD cells may be the static TDD cell's UL-DL configuration information or UL-DL configuration and flexible subframe configuration information of the dynamic TDD cell. The static and dynamic TDD cells' information may be transmitted to the UE through system information or higher layer signaling. The eNB makes a scheduling decision on the DL data to the UE in the dynamic TDD cell at the subframe #n at operation 702. Thereafter, the eNB receives the control information corresponding to the static TDD cell's DL data and the control channel corresponding to the dynamic TDD cell's DL data at the static TDD cell's subframe #(n+k) at operation 703. Here, k denotes a value determined according to the reference UL-DL configuration.

Referring to FIG. 7B, the UE receives the static TDD cell and dynamic TDD cell information at operation 711. The static and dynamic TDD cells' information may be the static TDD cell's UL-DL configuration information or UL-DL configuration flexible subframe configuration information of the dynamic TDD cell. The static and dynamic TDD cells' information is transmitted to the system information or higher layer signaling. The UE receives the scheduling information on the dynamic TDD cell's downlink data at subframe #n at operation 712. Thereafter, the UE transmits the control information on the static cell's DL data and the control information on the dynamic TDD cell's DL data at the static TDD cell's subframe #(n+k) according the reference UL-DL configuration at operation 713.

FIG. 8 is a diagram illustrating a principle of a control channel transmission method based on a transmission timing of a reference UL-DL configuration according to a sixth embodiment of the present disclosure.

The sixth embodiment of FIG. 8 is directed to the method for transmitting the DL control channel corresponding to the dynamic TDD cell's UL data based on the UL data scheduling timing and the DL control channel transmission timing of the reference UL-DL configuration. FIG. 8 shows the UL data scheduling and DL control channel transmission in the situation where the cell operating in different duplexing modes according to the sixth embodiment of the present disclosure.

Referring to FIG. 8, a PCell operates in a static TDD mode 801 with the TDD UL-DL configuration #2. An SCell operates in a dynamic TDD 802 with the TDD UL-DL configuration #3.

In the dynamic TDD cell 802 operating in the dynamic TDD mode, the subframes #3 and #4 are flexible subframes that can be used as UL subframes as configured in the TDD UL-DL configuration #3 or as downlink subframes. The configuration information indicating whether the flexible subframes are used as UL subframes or DL subframes is transmitted to the UE through higher layer signaling, system information, or downlink common control channel.

If the flexible subframe configuration information indicates that the flexible subframe #3 is used as the uplink subframe, a PUSCH 804 is capable of being scheduled at the flexible subframe #3 of the dynamic TDD cell 802. If a PDCCH 803 scheduling the UL data of the dynamic TDD cell 802 is transmitted at the DL subframe #6 of the static TDD cell 801, the UL data scheduled with the PDCCH 803 is transmitted by the UE in the form of the PUSCH 804 at the flexible subframe #3 of the dynamic TDD cell 802 after 7 subframes since the PDCCH transmission according to the reference UL-DL configuration #6 806 as proposed in the present disclosure.

Thereafter, the DL control channel corresponding to the PUSCH 804 scheduled at the flexible subframe #3 of the dynamic TDD cell 802 is transmitted by the eNB in the form of UL grant/PHICH 805 at the DL subframe #9 of the static TDD cell 801 after 6 subframes since the PUSCH transmission according to the reference UL-DL configuration #6 806 as proposed in the present disclosure.

In the original TDD UL-DL configuration #3, the UL data scheduled with the PDCCH transmitted at the DL subframe #9 is transmitted at the UL subframe #3 after 4 subframes since the PDCCH transmission, and the DL control channel corresponding to the PUSCH transmitted at the UL subframe #3 is transmitted at the DL subframe #9 after 6 subframes since the PUSCH transmission.

Here, the reference UL-DL configuration is determined as follows. Assuming that the UL subframe of the TDD UL-DL configuration #2 of the static TDD cell 801, the UL subframe of the TDD UL-DL configuration #3 of the dynamic TDD cell 802, and the subframes #3 and #4 as the flexible subframes of the dynamic TDD cell 802 are all UL subframes, the UL-DL configuration including all these UL subframes is determined as the reference UL-DL configuration. Referring to FIG. 8, the UL-DL configuration #6 as the reference UL-DL configuration includes all the UL subframes matching the UL subframe of the UL-DL configuration #2, the UL subframe of the UL-DL configuration #3, and the flexible subframe of the UL-DL configuration #3 as UL subframes.

As described above, the control channel transmission method is capable of scheduling the UL data of the dynamic TDD cell 802 and transmitting the DL control channel corresponding to the UL data based on the UL data scheduling timing and DL control channel transmission timing of the reference UL-DL configuration so as to use the control channel transmission timing even when the transmission timing specified in UL-DL configurations of the legacy static TDD cell 801 and dynamic TDD cell 802 are not applicable, resulting in an increase of data transmission throughput.

Figure 9A:
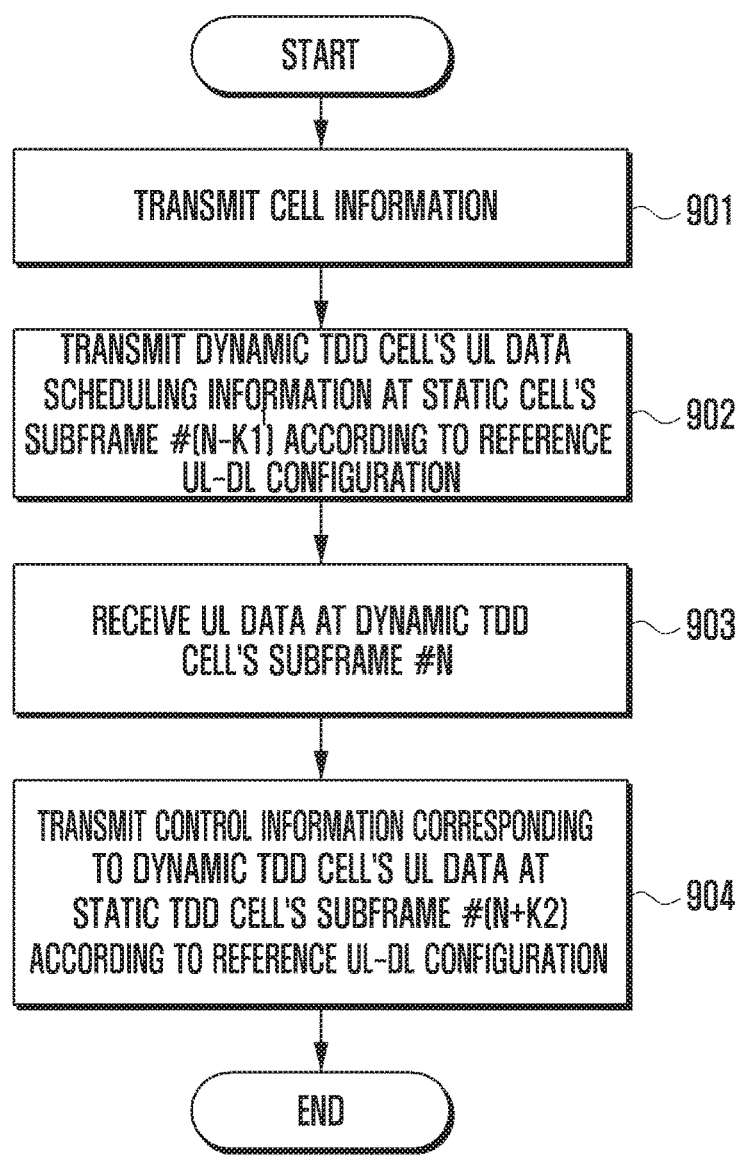
FIG. 9A is a flowchart illustrating an eNB procedure of a control channel transmission method according to an embodiment of the present disclosure.
Figure 9B:
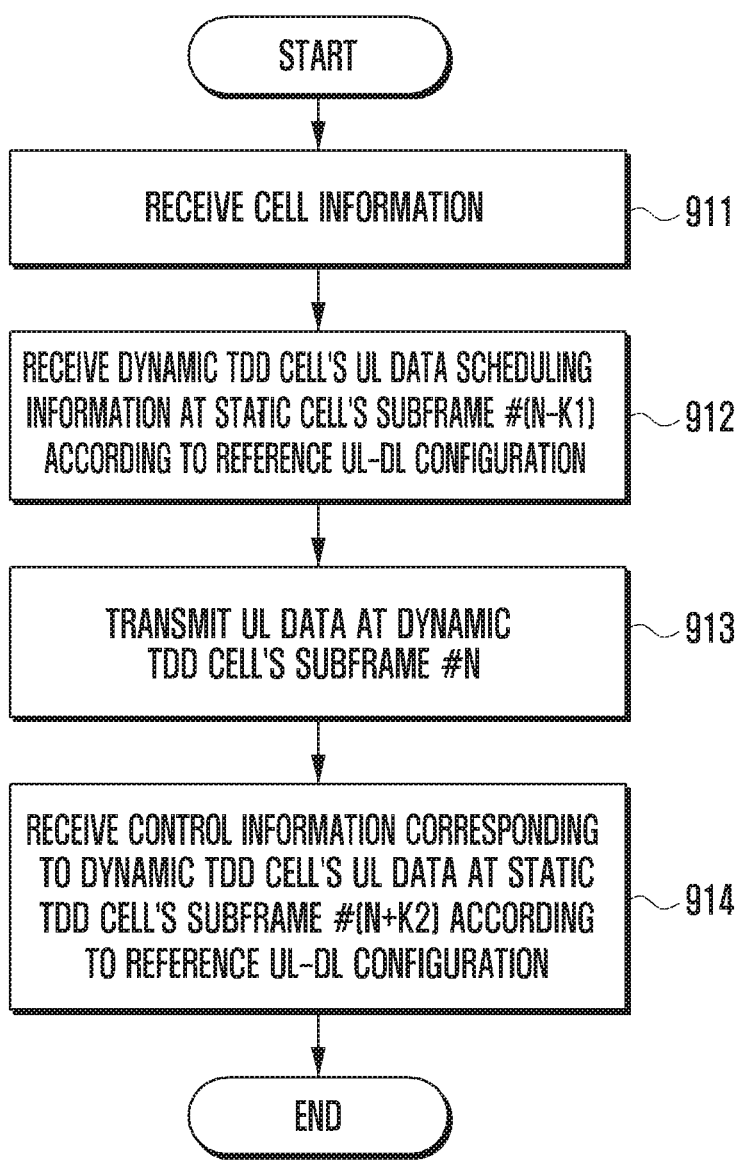
FIG. 9B is a flowchart illustrating a UE procedure of a control channel transmission method according to an embodiment of the present disclosure.

FIG. 9A is a flowchart illustrating an eNB procedure of a control channel transmission method according to an embodiment of the present disclosure, and FIG. 9B is a flowchart illustrating a UE procedure of a control channel transmission method according to an embodiment of the present disclosure.

Descriptions are made of the operation procedures of the eNB and UE for scheduling dynamic TDD cell's UL data at the UL data scheduling timing of the reference UL-DL configuration and transmitting the DL control channel corresponding to the UL data at the DL control channel transmission timing of the reference UL-DL configuration.

Referring to FIG. 9A, the eNB sends information on a static TDD cell and a dynamic TDD cell to the UE at operation 901. The static and dynamic TDD cells' information may be the UL-DL configuration information of the TDD cell or the UL-DL configuration and flexible subframe configuration information of the dynamic TDD cell. The static and dynamic TDD cells' information is transmitted to the UE through the system information or higher layer signaling. The eNB makes a scheduling decision on the UL data of the dynamic TDD cell at the static TDD cell's subframe #(n−k1) according to the reference UL-DL configuration and transmits the scheduling information to the UE at operation 902. Thereafter, the eNB receives UL data at the dynamic TDD cell's subframe #n at operation 903. The eNB transmits the control information corresponding to the dynamic TDD cell's UL data at the static TDD cell's subframe #(n+k$_2$) according to the reference UL-DL configuration at operation 904. Here, k$_1$ and k$_2$ denote the values determined according to the reference UL-DL configuration.

Referring to FIG. 9B, the UE receives the static and dynamic TDD cells' information from the eNB at operation 911. The static and dynamic TDD cell information may be the UL-DL configuration information of the TDD cell or the UL-DL configuration and flexible subframe configuration information of the dynamic TDD cell. The static and dynamic TDD cells' information is transmitted to the UE through the system information or higher layer signaling. The UE receives the scheduling information corresponding to the dynamic TDD cell's DL data at the static TDD cell's subframe #(n−k1) according to the reference UL-DL configuration at operation 912. Thereafter, the UE receives UL data at the dynamic TDD cell's subframe #n at operation 913. The UE receives the control information corresponding to the dynamic TDD cell's UL data at the static TDD cell's subframe #(n+k$_2$) according to the reference UL-DL configuration at operation 914. Here, k$_1$ and k$_2$ denote the values determined according to the reference UL-DL configuration.

Hereinafter, descriptions are made of the various embodiments in which the PCell operates in the static TDD mode with the TDD UL-DL configuration #3 and the SCell operates in the FDD mode.

Figure 12:
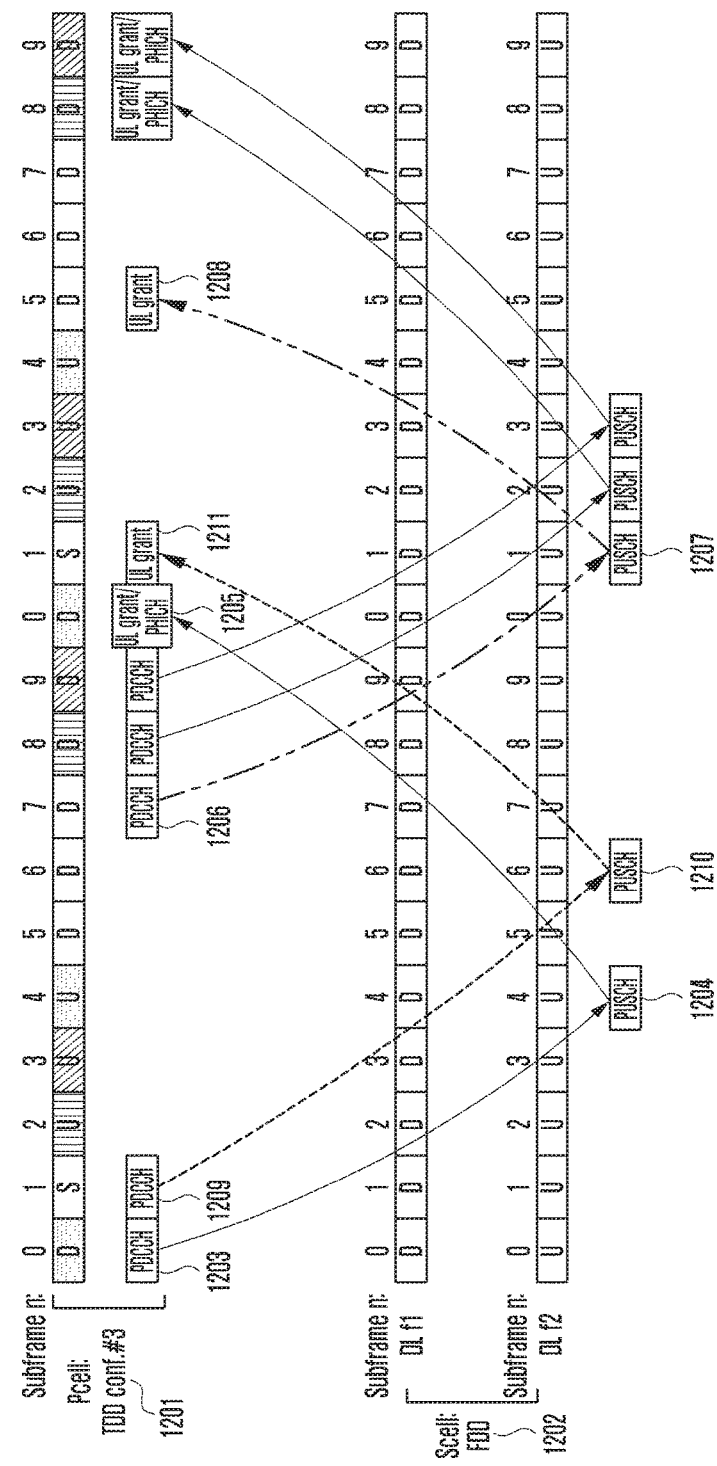
FIG. 12 is a diagram illustrating a principle of a control channel transmission method based on whether UL subframes of FDD and TDD cells match each other according to a seventh embodiment of the present disclosure.

FIG. 12 is a diagram illustrating a principle of a control channel transmission method based on whether UL subframes of FDD and TDD cells match each other according to a seventh embodiment of the present disclosure.

The seventh embodiment of FIG. 12 is directed to the method for transmitting the DL control channel corresponding to the FDD cell's UL data scheduled in the TDD cell according to the TDD cell's UL-DL configuration at the UL subframe matching between the TDD and FDD cells and according to the n+4 rule or n+5 rule timing at the UL subframe mismatching between the TDD and FDD cells.

FIG. 12 shows the UL data scheduling and UL control channel transmission in the situation where the cells operating in different duplexing modes coexist according to the seventh embodiment of the present disclosure.

Referring to FIG. 12, a PCell operates in a TDD mode 1201 with the TDD UL-DL configuration #3. An SCell operates in an FDD mode 1202 with the DL frequency f1 and UL frequency f2.

According to the method of the related art, the PDCCH scheduling the UL data at the UL subframe #4 of the TDD cell 1201 is transmitted at the DL subframe #0 of the TDD cell 1201, and the UL grant/PHICH as HARQ-ACK corresponding to the UL data transmitted at the UL subframe #4 is retransmitted at the DL subframe #0 of the TDD cell 1201.

In the TDD cell 1201, the subframes having the same pattern establish a UL HARQ process for PDCCH scheduling, PUSCH transmission, and UL grant/PHICH reception. A description is made of the control channel transmission based on the control channel transmission timing specified in the UL-DL configuration of the TDD cell at the FDD cell's UL subframe matching the TDD cell's UL subframe.

If the subframe #4 of the FDD cell 1202 identical with the UL subframe #4 of the TDD cell 1201 in subframe index is the UL subframe and if a PDCCH 1203 scheduling the UL data of the FDD cell 1202 is transmitted at the DL subframe #0 of the TDD cell 1201, the FDD cell's UL subframe matching the TDD cell's UL subframe, i.e., the UL subframe #4 of the FDD cell 1202, is used to transmit a PUSCH 1204 according to the control channel transmission timing defined in the TDD cell's UL-DL configuration.

The DL control channel corresponding to the PUSCH 1204 scheduled at the UL subframe #4 of the FDD cell 1202 is transmitted at the DL subframe #0 of the TDD cell 1201 in the form of UL grant/PHICH 1205 according to the control channel transmission timing defined in the UL-DL configuration of the TDD cell when the FDD cell's UL subframe matches the TDD cell's UL subframe.

A description is made of the method for applying the control channel transmission timing according to the n+4 rule at the FDD cell's UL subframe mismatching the TDD cell's UL subframe. This is applicable to the DL subframe of the TDD cell before or after 4 subframes from the UL data transmission timing at the FDD cell.

In order to schedule the UL data at the UL subframe #1 of the FDD cell 1201 which mismatches the UL subframe of the TDD cell 1201 in a subframe index, a PDCCH 1206 is transmitted at the DL subframe #7 of the TDD cell 1201 before 4 subframes according to the n+4 rule as the FDD cell's UL subframe mismatching the TDD cell's UL subframe as proposed in the present disclosure.

The DL control channel corresponding to PUSCH 1207 scheduled at the UL subframe #1 of the FDD cell 1202 is transmitted at the DL subframe #5 of the TDD cell 1201 in the form of UL grant 1208 after 4 subframes since the PUSCH transmission according to the n+4 rule in a case where the FDD cell's UL subframe mismatches the TDD cell's UL subframe as proposed in the present disclosure. Since the DL subframe #5 is the DL subframe not reserved for PHICH, it can be used for transmitting UL grant in response to a retransmission request and, if no UL grant is carried, it is regarded that the UL data is decoded successfully.

A description is made of the method for applying the control channel transmission timing defined according to the n+5 rule at the FDD cell's UL subframe mismatching the TDD cells' UL subframe. This method is applicable when the TDD cell's subframe before or after 5 subframes from the FDD cell's UL data transmission timing is a DL subframe.

In order to schedule the UL data at the UL subframe #6 of the FDD cell 1202 which mismatches the UL subframes of the TDD cell 1201 in the subframe index, a PDCCH 1209 is transmitted at the DL subframe #1 of the TDD cell 1201 before 5 subframes according to the n+5 rule in a case where the FDD cell's UL subframe mismatches the TDD cell's UL subframe as proposed in the present disclosure.

The downlink control channel corresponding to a PUSCH 1210 scheduled at the UL subframe #6 of the FDD cell 1202 is transmitted at the DL subframe #1 of the TDD cell 1201 in the form of UL grant 1211 after 5 subframes since the PUSCH transmission according to the n+5 rule in a case where the FDD cell's UL subframe mismatches the TDD cell's UL subframe as proposed in the present disclosure. Since the DL subframe #1 is not the DL subframe reserved for PHICH, it can be used for transmitting UL grant in response to a retransmission request and, if no UL grant is carried, it is regarded that the UL data is decoded successfully.

As described above, the control channel transmission method is capable of transmitting the DL control channel corresponding to the UL data of the FDD cell according to the control channel transmission timing defined in the UL-DL configuration of the TDD cell at the FDD cell's UL subframe matching the TDD cell's UL subframe as proposed in the present disclosure and according to the n+4 or n+5 rule timing in the FDD cell's UL subframe mismatching the TDD cell's UL subframe, thereby transmitting the control channel earlier as compared to the control channel transmission timing defined in the legacy TDD UL-DL configuration and increasing the scheduling frequency in the FDD cell 1202 with the more HARQ processes as compared to the UL HARQ processes defined for TDD cell 1201, resulting in an increase of data transmission throughput.

Figure 13A:
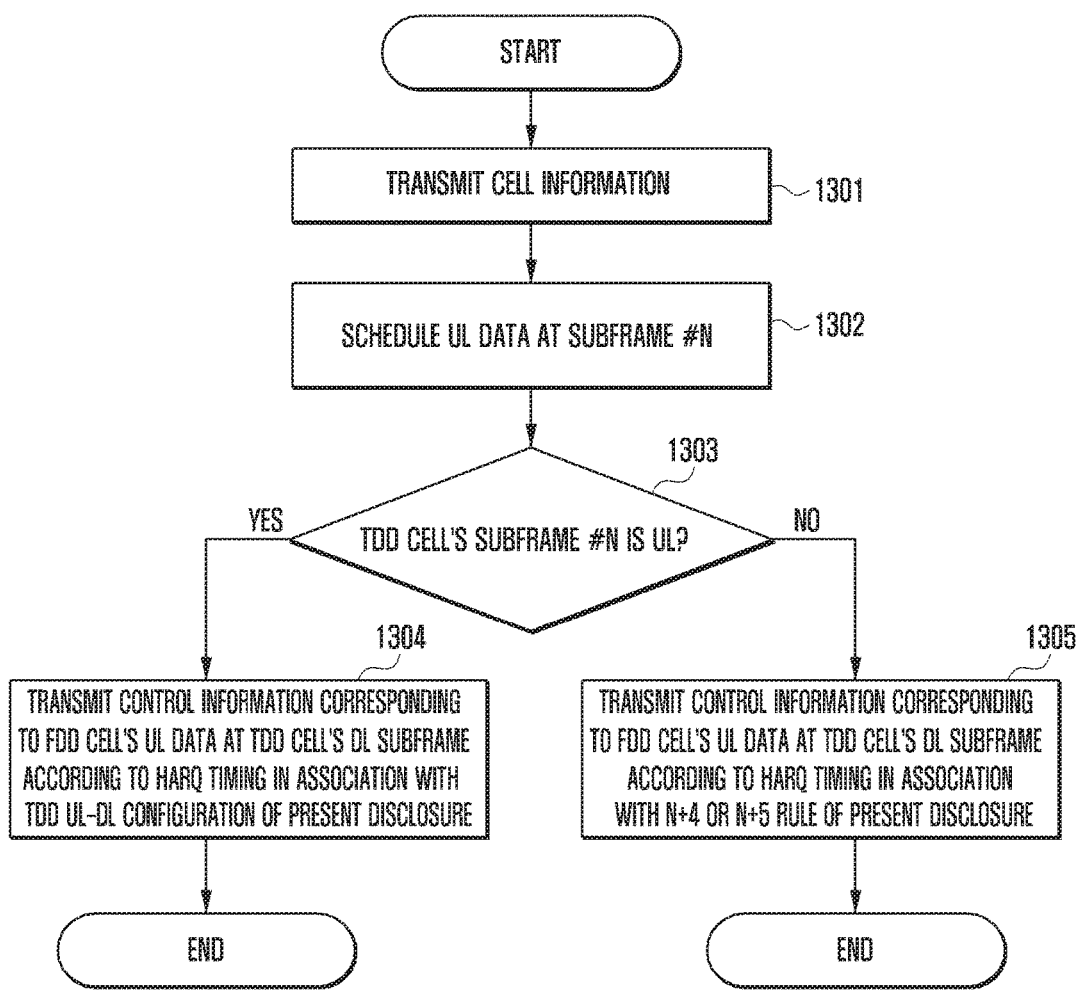
FIG. 13A is a flowchart illustrating an eNB procedure of a control channel transmission method according to an embodiment of the present disclosure.
Figure 13B:
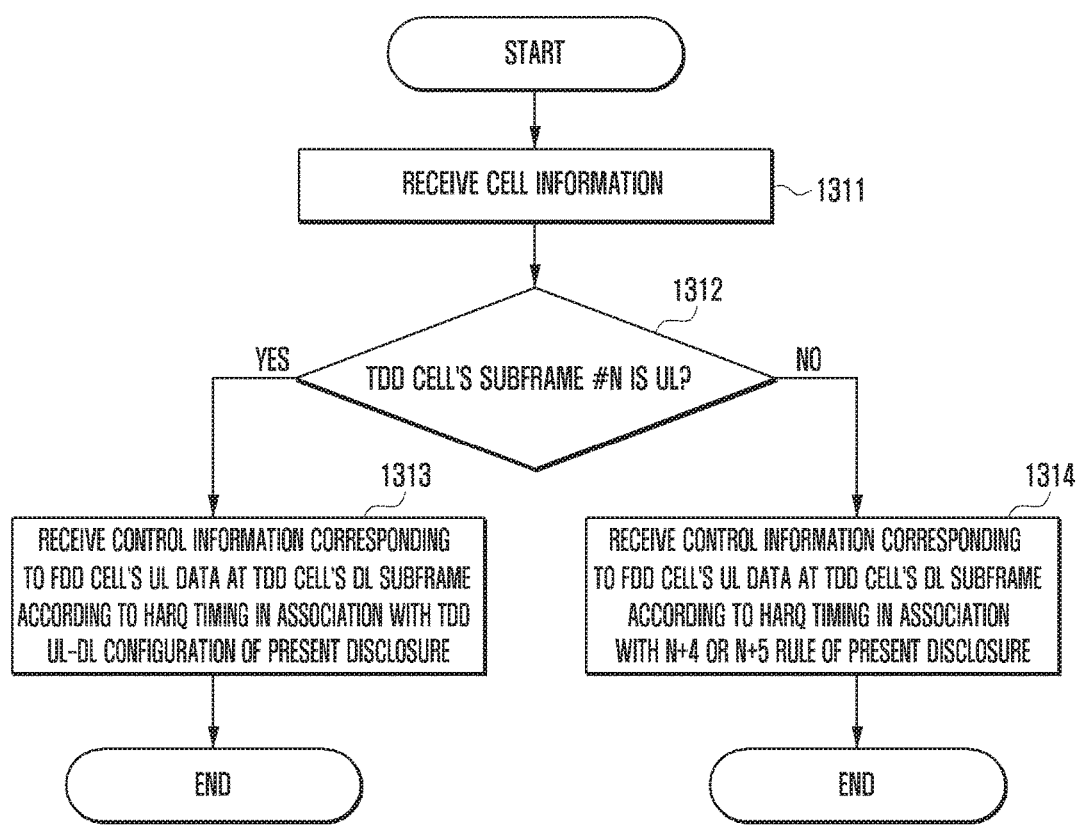
FIG. 13B is a flowchart illustrating a UE procedure of a control channel transmission method according to an embodiment of the present disclosure.

FIG. 13A is a flowchart illustrating an eNB procedure of a control channel transmission method according to an embodiment of the present disclosure, and FIG. 13B is a flowchart illustrating a UE procedure of a control channel transmission method according to an embodiment of the present disclosure.

Descriptions are made of the operation procedures of the eNB and UE for transmitting DL control channel corresponding to the FDD cell's UL data scheduled in the TDD cell according to the control channel transmission timing defined in the UL-DL configuration of the TDD cell at the FDD cell's UL subframe matching the TDD cell's UL subframe and the n+4 or n+5 rule timing at the FDD cell's UL subframe mismatching the TDD cell's UL subframe.

Referring to FIG. 13A, the eNB sends information on an FDD cell and a TDD cell to the UE at operation 1301. The FDD and TDD cells' information may be the UL and DL frequencies information of the FDD cell or the UL-DL configuration of the TDD cell. The FDD and TDD cells' information is transmitted to the UE through the system information or a higher layer signaling.

The eNB makes a scheduling decision on the FDD cell's UL data of the UE at the subframe #n at operation 1302. Thereafter, the eNB determines whether the TDD cell's subframe #n is the UL subframe at operation 1303. If the TDD cell's subframe #n is the UL subframe at operation 1303, the eNB transmits the scheduling information corresponding to the FDD cell's UL data and the control information at the TDD cell's DL subframe according to the HARQ timing in association with the TDD cell's UL-DL configuration as proposed in the present disclosure at operation 1304. Otherwise, if the TDD cell's subframe #n is not the UL subframe at operation 1303, the eNB transmits the scheduling information corresponding to the FDD cell's UL data and the control information at the TDD cell's DL subframe according to the HARQ timing in association with the n+4 or n+5 rule at operation 1305. The eNB receives the UL data at the subframe #n according to the scheduling information transmitted at operation 1304 or 1305.

Referring to FIG. 13B, the UE receives the FDD and TDD cells' information from the eNB at operation 1311. The FDD and TDD cells' information may be the UL and DL frequencies information of the FDD cell or the UL-DL configuration of the TDD cell. The FDD and TDD cells' information is received from the eNB through the system information or higher layer signaling.

The UE determines whether the TDD cell's subframe #n is the UL subframe at operation 1312. If the TDD cell's subframe #n is the UL subframe, the UE receives the scheduling information corresponding to the FDD cell's UL data and control information at the TDD cell's DL subframe according to the HARQ timing in association with the TDD UL-DL configuration at operation 1313. If the TDD cell's subframe #n is not the UL subframe, the UE receives the scheduling data corresponding to the FDD cell's UL data and control data at the TDD cell's DL subframe according to the HARQ timing in association with the n+4 or n+5 rule as proposed in the present disclosure at operation 1314. The UE transmits the UL data at the subframe #n according to the scheduling information received at operation 1313 or 1314.

Figure 14:
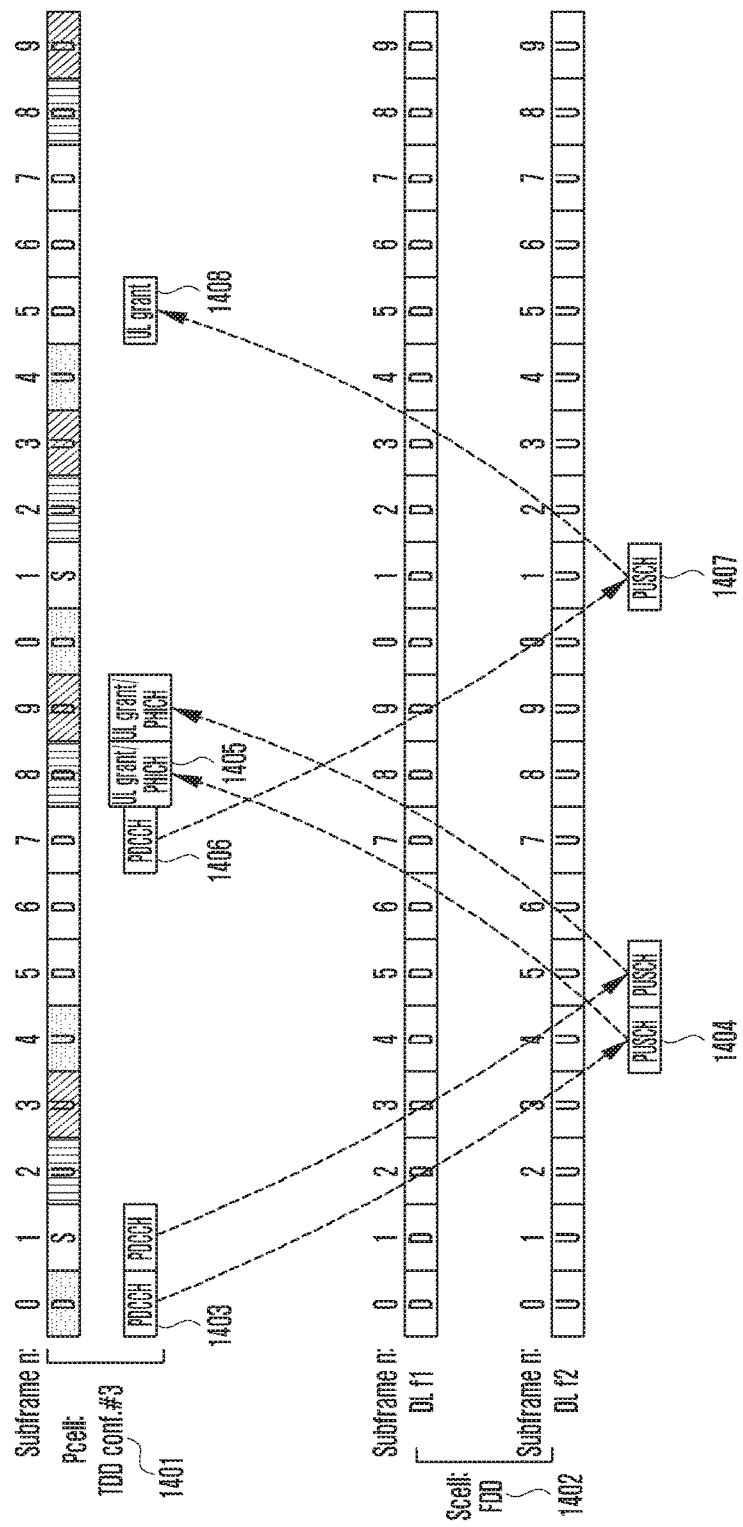
FIG. 14 is a diagram illustrating a principle of a control channel transmission method based on a control channel transmission timing defined for use in an FDD cell for UL data transmission at the FDD cell's UL subframe according to an eighth embodiment of the present disclosure.

FIG. 14 is a diagram illustrating a principle of a control channel transmission method based on a control channel transmission timing defined for use in an FDD cell for UL data transmission at the FDD cell's UL subframe according to an eighth embodiment of the present disclosure.

The eighth embodiment of FIG. 14 is directed to the method for transmitting the DL control channel corresponding to the FDD cell's UL data scheduled in the TDD cell according to the control channel transmission timing defined for use in the FDD cell, e.g., n+4 rule timing.

FIG. 14 shows the UL data scheduling and DL control channel transmission in the situation where the cells operating in different duplexing modes coexist according to the eighth embodiment of the present disclosure.

Referring to FIG. 14, a PCell operates in a TDD mode 1401 with TDD UL-DL configuration #3. An SCell operates in an FDD mode 1402 with the DL frequency f1 and UL frequency f2.

According to the technology of the related art, PDCCH scheduling the UL data at the UL subframe #4 of the TDD cell 1401 is transmitted at the DL subframe #0 of the TDD cell 1401, and the UL grant/PHICH as the HARQ-ACK corresponding to the UL data scheduled at the UL subframe #4 is retransmitted at the DL subframe #0 of the TDD cell 1401. The subframes having the same pattern in the TDD cell 1401 establish a UL HARQ process for PDCCH scheduling, PUSCH transmission, and UL grant/PHICH reception.

A description is made of the control channel transmission based on the control channel transmission timing of the n+4 rule in the TDD cell in correspondence to the UL data transmission at the FDD cell's UL subframe. This method is applicable to the case where the TDD cell's subframe before or after 4 subframes from the UL data transmission timing in the FDD cell is the downlink subframe.

In order to schedule the UL data at the UL subframe #4 of the FDD cell 1402, a PDCCH 1403 is transmitted at the DL subframe #0 of the TDD cell 1401 before 4 subframes since the UL data transmission according to the n+4 rule as proposed in the present disclosure. The DL control channel corresponding to the PUSCH 1404 scheduled at the UL subframe #4 of the FDD cell 1402 is transmitted at the DL subframe #8 of the TDD cell 1401 in the form of UL grant/PHICH 1405 after 4 subframes according to the n+4 rule as proposed in the present disclosure.

In order to schedule the UL data at the UL subframe #1 of the FDD cell 1402, a PDCCH 1406 is transmitted at the DL subframe #7 of the TDD cell 1401 before 4 subframes according to the n+4 rule as proposed in the present disclosure. The DL control channel corresponding to a PUSCH 1407 scheduled at the UL subframe #1 of the FDD cell 1402 is transmitted at the DL subframe #5 of the TDD cell 1401 in the form of UL grant 1408 after 4 subframes since the PUSCH transmission according to the n+4 rule as proposed in the present disclosure. Since the DL subframe #5 is the DL subframe not reserved for PHICH, it can be used for transmitting UL grant in response to a retransmission request and, if no UL grant is carried, it is regarded that the UL data is decoded successfully.

As described above, the control channel transmission method according to an embodiment of the present disclosure applies the n+4 rule of the FDD cell in transmitting the DL control channel corresponding to the UL data of the FDD cell 1402 so as to use earlier control channel transmission timing as compared to the timing defined for use in the TDD cell 1201, resulting in an increase of data transmission throughput.

Although the description is directed to the case where the n+4 rule timing is applied as the control channel transmission timing defined for use in the FDD cell when transmitting the DL control channel corresponding to the FDD cell's UL data scheduled in the TDD cell, the present disclosure is not limited thereto but can be implemented with the application of the n+5 rule described in the seventh embodiment when it is applicable without influence to the process operating with the n+4 rule timing.

For example, if the TDD cell's subframe before or after 5 subframes from the UL data transmission timing in the FDD cell is the DL subframe, the n+5 rule timing can be applied.

In order to schedule the UL data at the subframe #n of the FDD cell 1402, the PDCCH is transmitted at the DL subframe #(n−5) of the TDD cell 1401 before 5 subframes according to the n+5 rule as proposed in the present disclosure. The DL control channel corresponding to the PUSCH scheduled at the UL subframe #n of the FDD cell 1402 is transmitted at the DL subframe #(n+5) of the TDD cell in the form of UL grant/PHICH or UL grant in a case where the PHICH is not defined after 5 subframes according to the n+5 rules as proposed in the present disclosure.

Figure 15A:
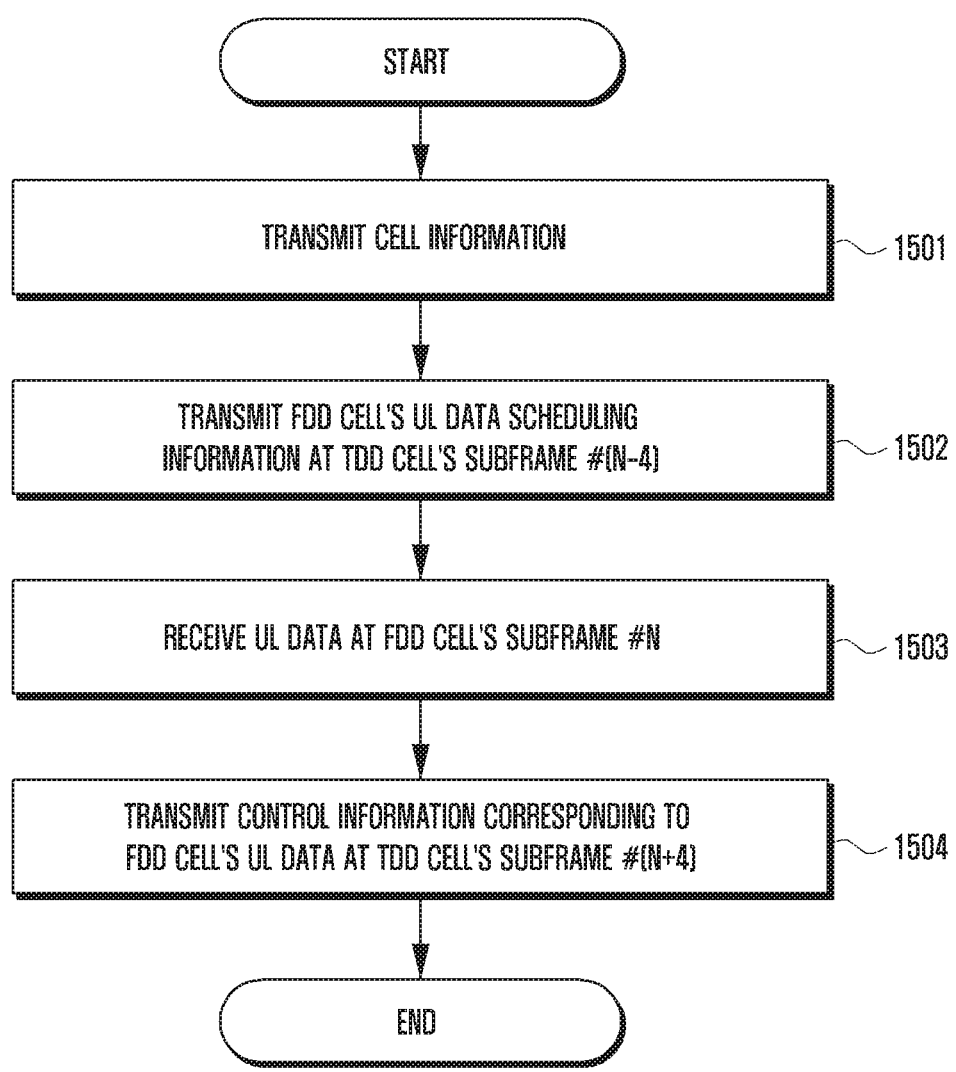
FIG. 15A is a flowchart illustrating an eNB procedure of a control channel transmission method according to an embodiment of the present disclosure.
Figure 15B:
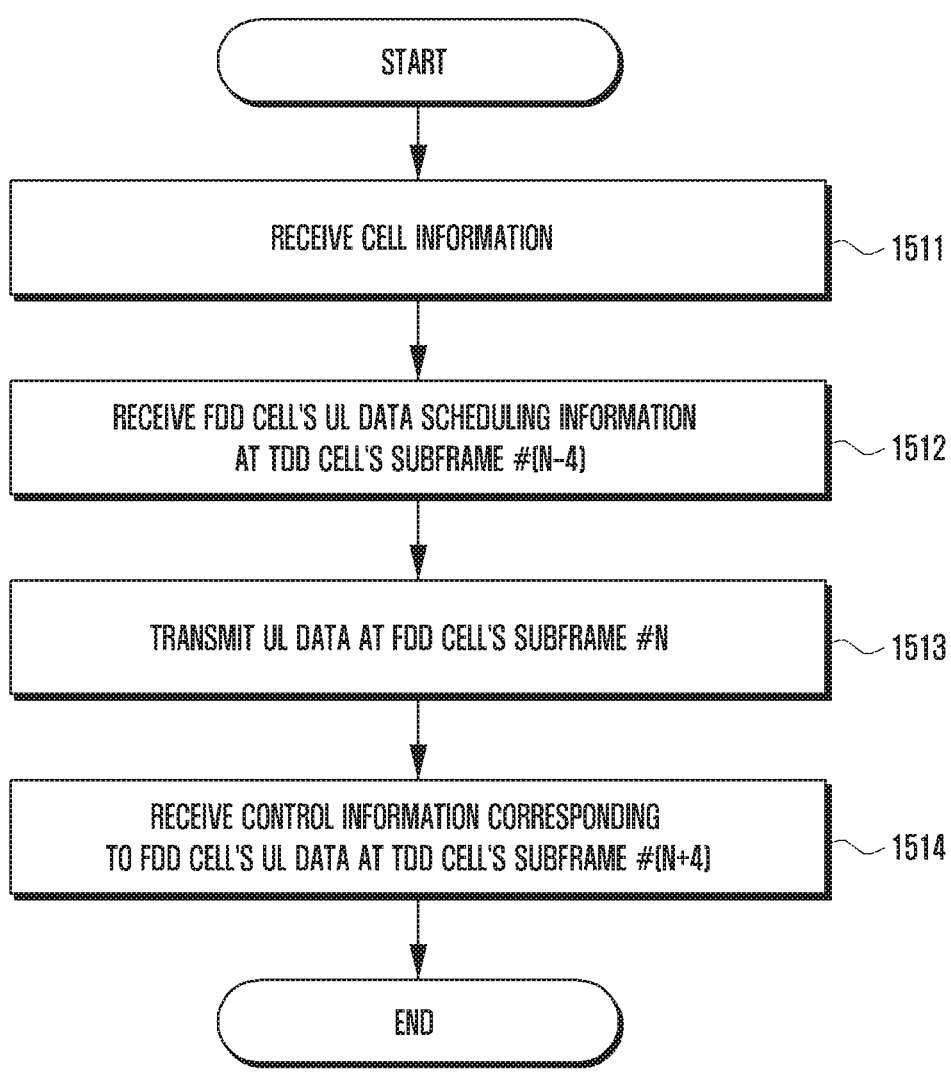
FIG. 15B is a flowchart illustrating a UE procedure of a control channel transmission method according to an embodiment of the present disclosure.

FIG. 15A is a flowchart illustrating an eNB procedure of a control channel transmission method according to an embodiment of the present disclosure, and FIG. 15B is a flowchart illustrating a UE procedure of a control channel transmission method according to an embodiment of the present disclosure.

Descriptions are made of the operation procedures of the eNB and UE for scheduling the UL data of the FDD cell and transmitting the DL control channel corresponding to the UL data in the TDD cell according to the TDD cell's UL data scheduling timing and DL control channel transmission timing with reference to FIGS. 15A and 15B.

Referring to FIG. 15A, the eNB sends information on FDD and TDD cells to the UE at operation 1501. The FDD and TDD cells' information may be the FDD cell's UL and DL frequencies information or the TDD cell's UL-DL configuration information. The FDD and TDD cells' information is transmitted to the UE through the system information or a higher layer signaling.

The eNB makes a scheduling decision on the FDD cell's UL data at the TDD cell's subframe #(n−4) for the UE and sends the scheduling information to the UE at operation 1502. Thereafter, the eNB receives UL data at the FDD cell's subframe #n at operation 1503. The eNB sends control information corresponding to the FDD cell's UL data at the TDD cell's subframe #(n+4) to the UE at operation 1504.

Referring to FIG. 15B, the UE receives the FDD and TDD cells' information from the eNB at operation 1511. The FDD and TDD cells' information may be the FDD cell's UL and DL frequencies information or the TDD cell's UL-DL configuration information. The UE receives the FDD and TDD cells' information through the system information or higher layer signaling. The UE receives the scheduling information on the FDD cell's UL data at the TDD cell's subframe #(n−4) at operation 1512. The UE sends the UL data at the FDD cell's subframe #n based on the scheduling information at operation 1513. Finally, the UE receives the control information corresponding to the FDD cell's UL data at the TDD cell's subframe #(n+4) at operation 1514.

According to an embodiment of the present disclosure, the FDD cell's UL data is scheduled according to the HARQ timing of the second embodiment for transmitting the control channel based on the control channel transmission timing defined in the TDD cell's UL-DL configuration at the FDD cell's UL subframe matching the TDD cell's UL subframe and the n+4 or n+5 rule timing at the FDD cell's uplink subframe mismatching the TDD cell's UL subframe, and there is a difference from the situation where the FDD cells exist when transmitting the HARQ-ACK corresponding to the scheduled UL data at the TDD cell's DL subframe.

In the situation where the FDD cells exist, the PUSCH may be scheduled at every UL subframe through DL subframe before 4 subframes, and the HARQ-ACK (PHICH/UL grant) may be transmitted through the DL control channel at the UL subframe after 4 subframes whenever the PUSCH is scheduled. Accordingly, the one DL subframe is not used for scheduling PUSCHs at the UL subframes having different indices.

In a case where the TDD cell configured as the PCell with the UL-DL configuration #0 and the FDD cell's UL data is scheduled in the TDD cell as the PCell, the PDCCH scheduling the PUSCH at the plural UL subframes of the FDD cell has to be transmitted at DL subframe of the TDD cell.

In the technology of the related art, if the TDD cell operates with the UL-DL configuration #0, the number of uplink subframes is greater than the number of downlink subframes such that a UL index field is included in PDCCH for scheduling PUSCHs of plural UL subframes at one DL subframe. In the technology of the related art, if the UL index field is set to "11", this indicates scheduling PUSCHs of plural UL subframes.

According to an embodiment of the present disclosure, if the TDD cell as the PCell operating with the UL-DL configuration #0 and the FDD cell as the SCell coexist and if the PDCCH scheduling the PUSCH of the FDD cell includes the UL index field, the UL index field is used for scheduling PUSCHs of plural UL subframes of the FDD cell.

Figure 16:
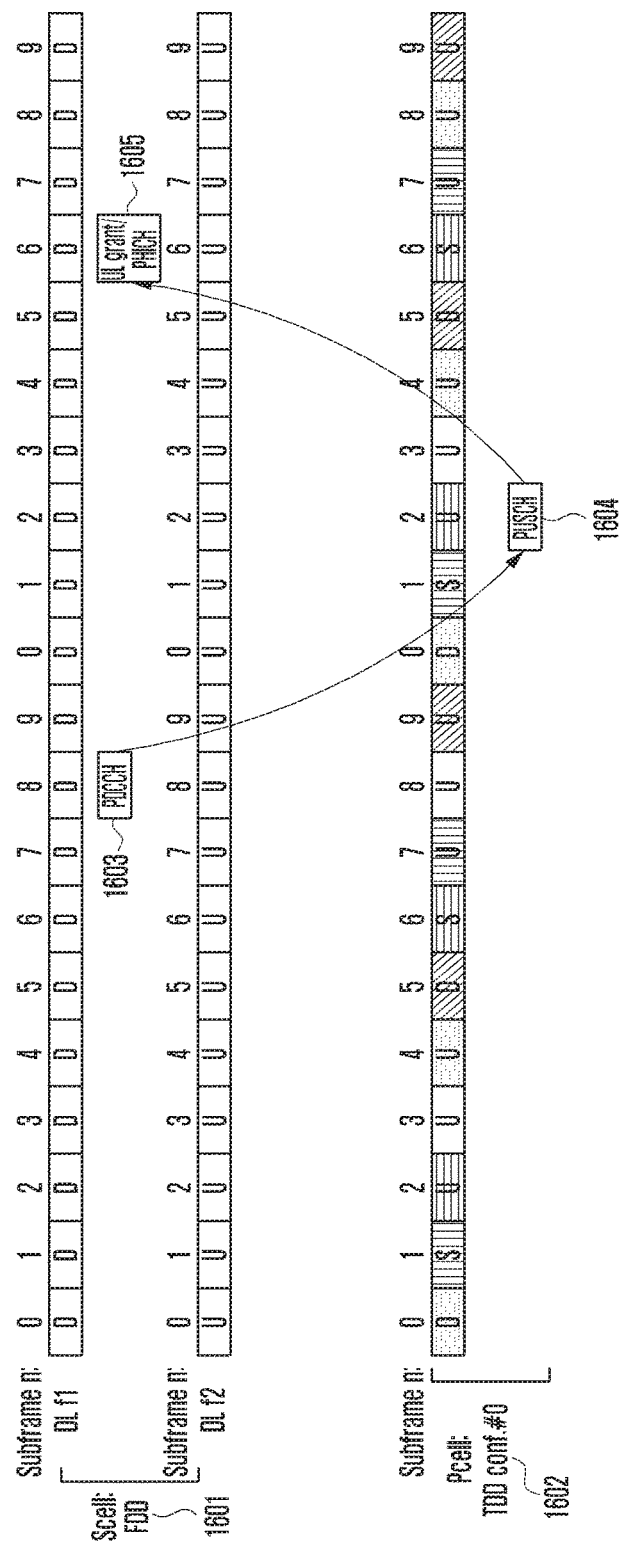
FIG. 16 is a diagram illustrating a principle of a control channel transmission method according to a ninth embodiment of the present disclosure.

FIG. 16 is a diagram illustrating a principle of a control channel transmission method according to a ninth embodiment of the present disclosure.

Referring to FIG. 16, an FDD cell 1601 is a PCell, and a TDD cell 1602 is an SCell operating with the TDD UL-DL configuration #0. Unlike the various embodiments of FIGS. 12 to 15 where the FDD cell is the S Cell and the TDD cell is the PCell, the FDD cell is the PCell and the TDD cell is the SCell in the embodiment of FIG. 16.

Referring to FIG. 16, if a PDCCH 1603 scheduling the UL data of the TDD cell 1602 is transmitted at the DL subframe #8 of the FDD cell 1601, the UL data scheduled with the PDCCH 1603, i.e., a PUSCH 1604, is transmitted at the UL subframe #2 of the TDD cell 1602 in the form of UL grant/PHICH 1605 after 4 subframes according to the UL data transmission timing corresponding to the FDD cell's DL control channel transmission.

Although the PUSCH is scheduled at the UL subframe of the TDD cell operating with the UL-DL configuration #0, the PUSCH may be scheduled at every UL subframe through PDCCH at every DL subframe of the FDD cell. In this case, the UL index field for transmitting PUSCHs at plural UL subframes in the TDD cell becomes unnecessary.

Accordingly, in a case where the FDD as the PCell and TDD cell as the SCell operating with the UL-DL configuration #0 coexist, the UL index field may not be used in the PDCCH for scheduling the PUSCH of the TDD cell. According to a modified embodiment, the UL index field of the PDCCH for scheduling PUSCH of the TDD cell may be set to 0. According to another modified embodiment, the PDCCH may not include the UL index field.

Figure 10:
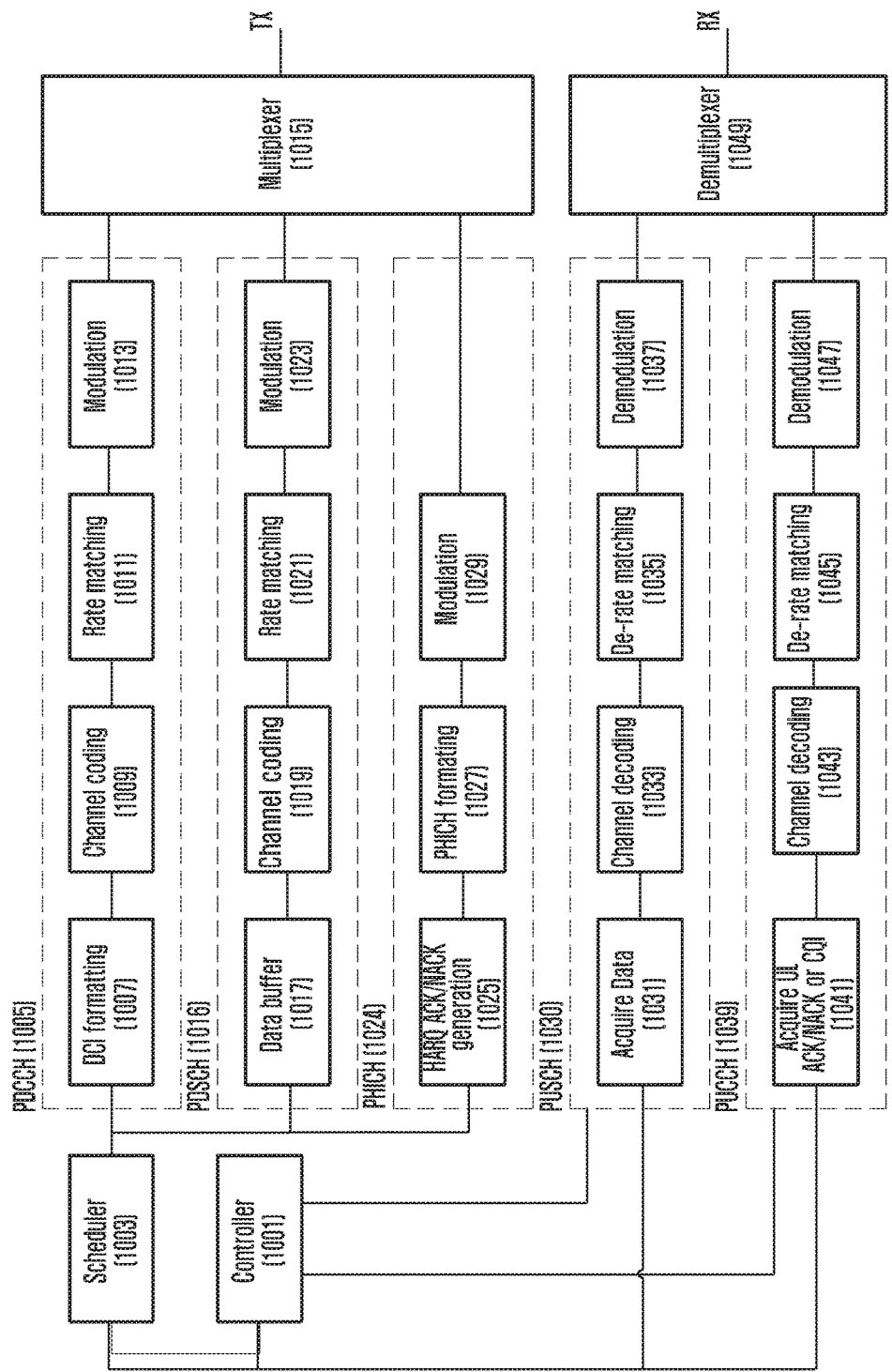
FIG. 10 is a block diagram illustrating a configuration of an eNB according to an embodiment of the present disclosure.

FIG. 10 is a block diagram illustrating a configuration of an eNB according to an embodiment of the present disclosure.

Referring to FIG. 10, the eNB includes a transmitter having a PDCCH block 1005, a PDSCH block 1016, a PHICH block 1024, a multiplexer 1015, a receiver having a PUSCH block 1030, a PUCCH block 1039, and a demultiplexer 1049, a controller 1001 for controlling DL/UL HARQ-ACK transmission/reception timing, and a scheduler 1003.

Here, it is assumed that the DL/UL HARQ-ACK transmission timing includes PUCCH transmission timing corresponding to the PDSCH transmission, PUSCH transmission timing corresponding to PDCCH transmission, and UL grant/PHICH transmission timing corresponding to PUSCH transmission. Although large numbers of transmitters and receivers (except for a PUCCH block) may exist for transmitting and receiving signals in plural cells, the description is made under the assumption of one transmitter and one receiver for simplicity sake.

In the transmitter, the PDCCH block 1005 includes a DCI formatter 1007, a channel coder 1009, a rate matching unit 1011, and a modulator 1013, the PDSCH block 1016 includes a data buffer 1017, a channel coder 1019, a rate matching unit 1021, and a modulator 1023, and the PHICH block 1024 includes a HARQ-ACK/Non-ACKnowledgement (NACK) generator 1025, a PHICH formatter 1027, and a modulator 1029.

In the receiver, the PUSCH block 1030 includes a demodulator 1037, a de-rate matching unit 1035, a channel decoder 1033, and a data acquisition unit 1031, and the PUCCH block 1039 includes a demodulator 1047, a de-rate matching unit 1045, a channel decoder 1043, and an ACK/NACK or a Channel Quality Indicator (CQI) acquisition unit 1041.

The controller 1001 including the DL/UL HARQ-ACK transmission/reception timing control function configures the timing relationship among the physical channels for the UE to be scheduled by taking notice of the transmissive data amount and system resource headroom and notifies the scheduler 1003, the PDCCH block 1005, the PDSCH block 1016, the PHICH block 1024, the PUSCH block 1030, and the PUCCH block 1039 of the timing relationship. The DL/UL HARQ-ACK transmission/reception timing relationship follows the method described in the various embodiments of the present disclosure.

The PDCCH block 1005 formats a DCI by means of the DCI formatter 1007 under the control of the scheduler 1003, adds error correction capability to the DCI by means of the channel coder 1009, perform rate matching on the DCI to be fit for the resource amount by means of the rate matching unit 1011, modulates the rate matching result, and multiplex the modulated signal with other signals by means of the multiplexer 1015.

The PDSCH block 1016 reads out data from the data buffer 1017 under the control of the scheduler 1003, adds error correction capability to the read data by means of the channel coder 1019, matches the rate of the data to be fit for the allocated resource amount by means of the rate matching unit 1021, modulates the rate-matched data by means of the modulator 1023, and multiplexes the modulated data with other signals by means of the multiplexer 1015.

The PHICH block 1024 generates HARQ-ACK/NACK corresponding to the PUSCH received from the UE by means of the HARQ-ACK/NACK generator 1025 under the control of the scheduler 1003. The HARQ-ACK/NACK is configured to be fit for the PHICH channel structure by means of the PHICH formatter 1027, modulated by means of the modulator 1029, and multiplexed with other signals by means of the multiplexer 1015.

The multiplexed signals are generated into an OFDM signal to be transmitted to the UE.

In the receiver, the PUSCH block 1030 extracts PUSCH from the signal transmitted by the UE by means of the demultiplexer 1049, demodulates the extracted signal by means of the demodulator 1037, de-rate matches to generate the symbols before rate matching by means of the de-rate matching unit 1035, decoding the de-rate matched signal by means of the channel decoder 1033, and acquires PUSCH data by means of the data acquisition unit 1031.

The data acquisition unit 1031 notifies the scheduler 1003 of the presence/absence of error in the decoding result to control the generation of the DL HARQ-ACK/NACK and generates the decoding result error report to the controller 1001 having the DL/UL HARQ-ACK transmission/reception timing control function to adjust the DL HARQ-ACK/NACK transmission timing.

The PUCCH block 1030 separates PUCCH signal from the signal transmitted by the UE by means of the demultiplexer 1049 according to the DL/UL HARQ-ACK transmission/reception timing, decodes the demodulated signal by means of the channel decoder 1033, and acquires the UL ACK/NACK or CQI by means of the UL ACK/NACK or CQI acquisition unit 1041. The acquired UL ACK/NACK or CQI is supplied to the scheduler 1003 for use in determination of PUSCH retransmission and Modulation and Coding Scheme (MCS). In addition, the acquired UL ACK/NACK is sent to the controller 1001 for use in adjusting the PDSCH transmission timing.

Figure 11:
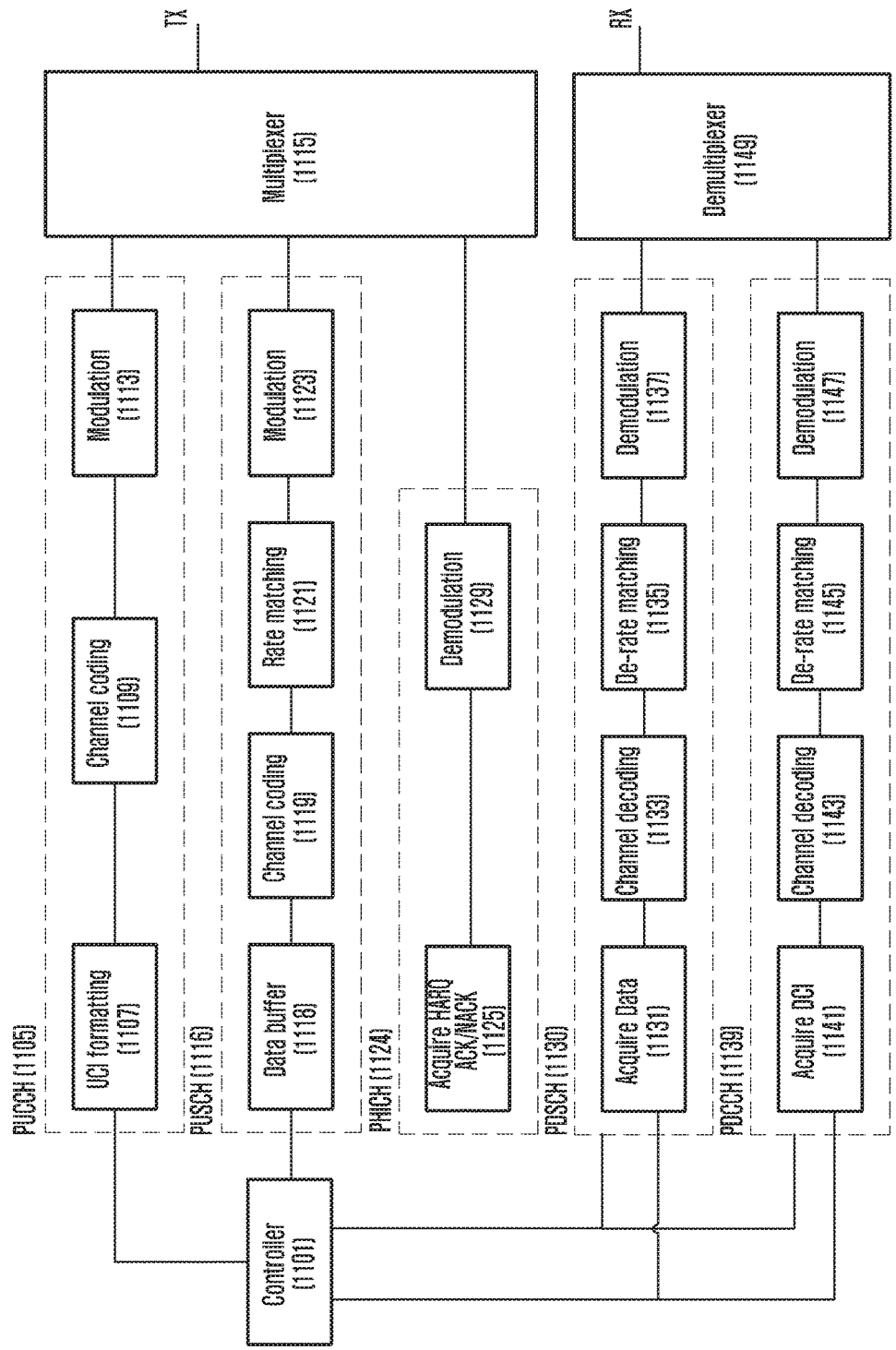
FIG. 11 is a block diagram illustrating a configuration of a UE according to an embodiment of the present disclosure.

FIG. 11 is a block diagram illustrating a configuration of a UE according to an embodiment of the present disclosure.

Referring to FIG. 11, the UE includes a transmitter having a PUCCH block 1105, a PUSCH block 1116, and a multiplexer 1115, a receiver having a PHICH block 1124, a PDSCH block 1130, a PDCCH block 1139, and a demultiplexer 1149, and a controller 1101 including a DL/UL HARQ-ACK transmission/reception timing control function.

In the transmitter, PUCCH block 1105 includes a UCI formatter 1107, a channel coder 1109, and a modulator 1113, and the PUSCH block 1116 includes a data buffer 1118, a channel coder 1119, a rate matching unit 1121, and a modulator 1123. In the receiver, the PHICH block 1124 includes an HARQ-ACK/NACK acquisition unit 1125 and a modulator 1129, the PDSCH block 1130 includes a demodulator 1137, a de-rate matching unit 1135, a channel decoder 1133, and a data acquisition unit 1131, and the PDCCH block 1139 includes a demodulator 1147, a de-rate matching unit 1145, a channel decoder 1143, and a DCI acquisition unit 1141.

Although large numbers of transmitters and receivers (except for PUCCH block) may exist for transmitting and receiving signals in plural cells, the description is made under the assumption of one transmitter and one receiver for simplicity sake.

The controller 1101 for controlling the DL/UL HARQ-ACK transmission/reception timing receives the information on the cell for receiving PDSCH or transmitting PUSCH in self-scheduling or cross carrier scheduling mode from the DCI transmitted by the eNB and adjusts the cell selection for DL/UL HARQ-ACK transmission and transmission/reception timing relationship among the physical channel, this information being notified to the PUCCH block 1105, the PUSCH block 1116, the PHICH block 1124, the PDSCH block 1130, and the PDCCH block 1139. The DL/UL HARQ-ACK transmission/reception timing relationship follows the above description made with the various embodiments of the present disclosure.

The PUCCH block 1105 configures UL/DL HARQ-ACK/NACK or CQI with Uplink Control Information (UCI) to be transmitted in a specific subframe in correspondence to PDSCH by means of the UCI formatter 1107, adds error correction capability to the UCI by means of the channel coder 1109, modulates the channel coded signal by means of the modulator 1113, and multiplexes the modulated signal with other signals by means of the multiplexer 1115.

The PUSCH block 1116 reads the data to be transmitted from the data buffer 1118, adds error correction capability to the data by means of the channel coder 1119, matches the rate of the data to be fit for the actual resource amount by means of the rate matching unit 1121, modulates the rate-matched signal by means of the modulator 1123, and multiplexes the modulated signal with other signals by means of the multiplexer 1115.

The multiplexed signal is processed to generate a Single Carrier Frequency Division Multiple Access (SC-FDMA) signal, the SC-FDMA signal being transmitted to the eNB by taking notice of the DL/UL HARQ-ACK transmission/reception timing according to an embodiment of the present disclosure.

In the receiver, the PHICH block 1124 separates PHICH from the signal transmitted by the UE in accordance with the DL/UL HARQ-ACK transmission/reception timing by means of the demultiplexer 1149, demodulates the PHICH by means of the demodulator 1129, and acquires HARQ-ACK/NACK corresponding to PUSCH by means of the HARQ-ACK/NACK acquisition unit 1125.

The PDSCH block 1130 separates PDSCH from the signal transmitted by the eNB by means of the demultiplexer 1149, demodulates PDSCH by means of the demodulator 1137, de-rate matches the demodulated signal to acquire the symbol before rate matching by means of the de-rate matching unit 1135, decodes the symbols by means of the channel decoder 1133, and acquires PDSCH data by means of the data acquisition unit 1131.

The data acquisition unit 1131 notifies the PUCCH block 1105 and the controller 1101 having the DL/UL HARQ-ACK transmission/reception timing control function of information on whether the decoding result is erroneous such that the PUCCH block 1105 adjusts the uplink HARQ-ACK/NACK generation and the controller 1101 adjusts uplink HARQ-ACK/NACK transmission timing.

The PDCCH block 1139 separates PDCCH from the signal transmitted by the eNB by means of the demultiplexer 1149, demodulates PDCCH by means of the demodulator 1147, decodes the demodulated signal by means of the channel decoder 1133, and acquires the DCI by means of the DCI acquisition unit 1141.

As described above, the control channel transmission method and apparatus of the present disclosure are capable of transmitting/receiving data through plural cells operating in different duplexing modes simultaneously, resulting in improvement of peak data rate.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in a wireless communication system, the method comprising:

transmitting, at a base station, information on a primary cell operating in a frequency division duplexing (FDD) mode and a secondary cell operating in a time division duplexing (TDD) mode;

transmitting, at the base station, configuration information configuring a first format of an uplink control channel;

transmitting, at the base station, downlink scheduling information for downlink data;

transmitting, at the base station, the downlink data in a first subframe according to the downlink scheduling information; and receiving, at the base station, control information corresponding to the downlink data on the primary cell, from a terminal, wherein the control information is received based on the first format of the uplink control channel, if the first subframe of the secondary cell is a downlink subframe, and wherein the control information is received based on a second format of the uplink control channel, if the first subframe of the secondary cell is an uplink subframe.

2. The method of claim 1, wherein the second format of the uplink control channel is PUCCH format 1a or PUCCH format 1b.

3. The method of claim 1, wherein the first format of the uplink control channel is PUCCH format 1b with channel selection.

4. The method of claim 1, wherein the control information comprises hybrid automatic repeat request—acknowledgement (HARQ-ACK) information corresponding to the downlink data of the primary cell if the first subframe of the secondary cell is an uplink subframe.

5. The method of claim 1, wherein the control information comprises hybrid automatic repeat request—acknowledgement (HARQ-ACK) information corresponding to the downlink data of the primary cell and the secondary cell if the first subframe of the secondary cell is a downlink subframe.

6. The method of claim 1, wherein the control information is transmitted in a fourth subframe after the first subframe.

7. The method of claim 1, wherein when the TDD mode of the secondary cell is a dynamic TDD mode, the first subframe of the secondary cell is a dynamic subframe.

8. The method of claim 1, wherein the wireless communication system supports intra-cell carrier aggregation.

9. An apparatus in a wireless communication system, the apparatus comprising:
a transceiver configured to transmit and receive at least one signal; and
a control unit comprising at least one processor and configured to:
transmit information on a primary cell operating in a frequency division duplexing (FDD) mode and a secondary cell operating in a time division duplexing (TDD) mode,
transmit configuration information configuring a first format of an uplink control channel,
transmit downlink scheduling information for downlink data,
transmit the downlink data in a first subframe according to the downlink scheduling information, and
receive control information corresponding to the downlink data on the primary cell from a terminal,
wherein the control information is received based on the first format of the uplink control channel if the first subframe of the secondary cell is a downlink subframe, and
wherein the control information is received based on a second format of the uplink control channel if the first subframe of the secondary cell is an uplink subframe.

10. The apparatus of claim 9, wherein the second format of the uplink control channel is PUCCH format 1a or PUCCH format 1b.

11. The apparatus of claim 9, wherein the first format of the uplink control channel is PUCCH format 1b with channel selection.

12. The apparatus of claim 9, wherein the control information comprises hybrid automatic repeat request—acknowledgement (HARQ-ACK) information corresponding to the downlink data of the primary cell if the first subframe of the secondary cell is an uplink subframe.

13. The apparatus of claim 9, wherein the control information comprises hybrid automatic repeat request—acknowledgement (HARQ-ACK) information corresponding to the downlink data of the primary cell and the secondary cell if the first subframe of the secondary cell is a downlink subframe.

14. The apparatus of claim 9, wherein the control information is transmitted in a fourth subframe after the first subframe.

15. The apparatus of claim 9, wherein when the TDD mode of the secondary cell is a dynamic TDD mode, the first subframe of the secondary cell is a dynamic subframe.

16. The apparatus of claim 9, wherein the wireless communication system supports intra-cell carrier aggregation.

* * * * *